(12) United States Patent
Demont et al.

(10) Patent No.: US 11,063,323 B2
(45) Date of Patent: Jul. 13, 2021

(54) BATTERY MODULE FOR ELECTRICALLY-DRIVEN AIRCRAFT

(71) Applicant: H55 SA, Sion (CH)

(72) Inventors: Sébastien Demont, Les Agettes (CH); Michaël Roger Fournier, Veysonnaz (CH); Stéphane Pierre-Jean Boirin, Montreux (CH)

(73) Assignee: H55 SA, Sion (CH)

( * ) Notice: Subject to any disclaimer, the term of this patent is extended or adjusted under 35 U.S.C. 154(b) by 0 days.

(21) Appl. No.: 17/064,012

(22) Filed: Oct. 6, 2020

(65) Prior Publication Data

US 2021/0083255 A1 Mar. 18, 2021

Related U.S. Application Data

(63) Continuation-in-part of application No. 16/842,595, filed on Apr. 7, 2020, now Pat. No. 10,854,866, and
(Continued)

(30) Foreign Application Priority Data

Jan. 23, 2019 (CH) .............................. 20190000073

(51) Int. Cl.
*H01M 50/502* (2021.01)
*H01M 10/48* (2006.01)
(Continued)

(52) U.S. Cl.
CPC ........... *H01M 50/502* (2021.01); *B60L 50/64* (2019.02); *B64D 27/24* (2013.01); *H01M 10/482* (2013.01);
(Continued)

(58) Field of Classification Search
CPC ............. H01M 50/249; H01M 50/213; H01M 50/174; H01M 50/20; H01M 50/502;
(Continued)

(56) References Cited

U.S. PATENT DOCUMENTS 4,434,389 A 2/1984 Langley et al.
4,550,267 A 10/1985 Vaidya
(Continued)

FOREIGN PATENT DOCUMENTS

CN 102255113 11/2011
CN 105711434 A 6/2016
(Continued)

OTHER PUBLICATIONS

Farrell et al., "Designing a Battery Exchange Building for Automated Guided Vehicles", Ports 2016, American Society of Civil Engineers, 2016, pp. 71-80.
(Continued)

*Primary Examiner* — Jonathan G Jelsma
(74) *Attorney, Agent, or Firm* — Knobbe, Martens, Olson & Bear LLP

(57) ABSTRACT

A battery module can include multiple cell tubes and a conductive plate. The multiple cell tubes can accommodate multiple battery cells within the multiple cell tubes so that individual of the multiple battery cells are positioned within individual of the multiple cell tubes. The conductive plate can include a printed circuit board. The printed circuit board can include a first conductive layer and an isolating layer. The isolating layer can include a blind hole through which a wire bonding extends. The wire bonding can be electrically connected to the first conductive layer.

20 Claims, 18 Drawing Sheets

Related U.S. Application Data a continuation-in-part of application No. 16/796,711, filed on Feb. 20, 2020, and a continuation-in-part of application No. PCT/IB2020/050520, filed on Jan. 23, 2020.

(60) Provisional application No. 62/830,691, filed on Apr. 8, 2019.

(51) Int. Cl.

| | | |
|---|---|---|
| *B64D 27/24* | (2006.01) | |
| *B60L 50/64* | (2019.01) | |
| *H01M 50/20* | (2021.01) | |
| *H01M 50/284* | (2021.01) | |
| *H01M 50/519* | (2021.01) | |

(52) U.S. Cl.
CPC .......... *H01M 10/486* (2013.01); *H01M 50/20* (2021.01); *H01M 50/284* (2021.01); *B60L 2200/10* (2013.01); *H01M 50/519* (2021.01); *H01M 2220/20* (2013.01)

(58) Field of Classification Search
CPC ............. H01M 10/482; H01M 10/486; H01M 2220/20; H01M 10/425; H01M 50/284; H01M 50/519; B60L 2200/10; B60L 50/64; B64D 27/24
See application file for complete search history.

(56) References Cited

U.S. PATENT DOCUMENTS

| | | | |
|---|---|---|---|
| 4,730,150 A | 3/1988 | Lee et al. | |
| 4,965,879 A | 10/1990 | Fischer, Jr. | |
| 5,225,764 A | 7/1993 | Falater | |
| 5,414,339 A | 5/1995 | Masaki et al. | |
| 5,850,113 A | 12/1998 | Weimer et al. | |
| 6,078,165 A | 6/2000 | Ashtiani et al. | |
| 6,108,347 A | 8/2000 | Holmquist | |
| 6,178,736 B1 | 1/2001 | Massey | |
| 6,366,311 B1 | 4/2002 | Monroe | |
| 6,439,504 B1 | 8/2002 | Ahrendt | |
| 6,791,226 B1 | 9/2004 | Dhawan | |
| 7,207,521 B2 | 4/2007 | Atkey et al. | |
| 7,482,767 B2 | 1/2009 | Tether | |
| 7,598,703 B2 | 10/2009 | Zhang et al. | |
| 7,706,398 B2 | 4/2010 | Jung et al. | |
| 8,120,310 B2 | 2/2012 | Littrell et al. | |
| 8,281,051 B2 | 10/2012 | Hartwich | |
| 8,341,449 B2 | 12/2012 | Daniel et al. | |
| 8,399,112 B2 | 3/2013 | Yasui et al. | |
| 8,738,217 B2 | 5/2014 | Banker | |
| 8,974,930 B2 | 3/2015 | Oguri et al. | |
| 9,436,261 B2 | 9/2016 | Yun | |
| 9,457,666 B2 | 10/2016 | Caldeira et al. | |
| 9,564,762 B2 | 2/2017 | Lee et al. | |
| 9,643,729 B2 | 5/2017 | Walter-Robinson | |
| 9,806,308 B2 | 10/2017 | Watanabe et al. | |
| 9,806,310 B1 | 10/2017 | Pounds | |
| 9,893,335 B2 | 2/2018 | Liu | |
| 10,131,246 B2 | 11/2018 | Demont | |
| 10,186,694 B2 | 1/2019 | Ueda et al. | |
| 10,186,697 B1 | 1/2019 | Harris, III | |
| 10,204,244 B2 | 2/2019 | Butler | |
| 10,305,078 B1 | 5/2019 | Harris, III | |
| 10,322,824 B1 | 6/2019 | Demont et al. | |
| 10,326,158 B2 | 6/2019 | Lee | |
| 10,479,223 B2 | 11/2019 | Demont | |
| 10,576,843 B2 | 3/2020 | Demont et al. | |
| 10,608,304 B2 | 3/2020 | Ruehle | |
| 2003/0182040 A1 | 9/2003 | Davidson | |
| 2003/0232236 A1 | 12/2003 | Mitchell et al. | |
| 2005/0162172 A1 | 7/2005 | Bertness | |
| 2006/0109009 A1 | 5/2006 | Banke | |
| 2007/0044737 A1 | 3/2007 | Lindsey | |
| 2007/0164166 A1 | 7/2007 | Hirvonen | |
| 2007/0164168 A1 | 7/2007 | Hirvonen et al. | |
| 2008/0006739 A1 | 1/2008 | Mochida et al. | |
| 2008/0211309 A1 | 9/2008 | Nolte | |
| 2008/0272669 A1 | 11/2008 | Mohle et al. | |
| 2009/0139781 A1* | 6/2009 | Straubel | B60L 50/64 180/65.1 |
| 2009/0212626 A1 | 8/2009 | Snyder | |
| 2009/0302153 A1 | 12/2009 | Matasso | |
| 2010/0101242 A1 | 4/2010 | Froelich | |
| 2010/0102934 A1 | 4/2010 | Guichard | |
| 2010/0121587 A1 | 5/2010 | Vian | |
| 2010/0255359 A1 | 10/2010 | Hirakawa et al. | |
| 2011/0054721 A1 | 3/2011 | Goodrich | |
| 2011/0254502 A1 | 10/2011 | Yount et al. | |
| 2012/0025032 A1 | 2/2012 | Hopdjanian | |
| 2012/0121949 A1 | 5/2012 | Eberhard et al. | |
| 2012/0146581 A1 | 6/2012 | Tu | |
| 2012/0177970 A1 | 7/2012 | Marchio et al. | |
| 2012/0203482 A1 | 8/2012 | Parle et al. | |
| 2012/0244404 A1 | 9/2012 | Obasih et al. | |
| 2012/0268069 A1 | 10/2012 | Park | |
| 2013/0040178 A1 | 2/2013 | Lim | |
| 2013/0076190 A1 | 3/2013 | Jarvinen et al. | |
| 2013/0090813 A1 | 4/2013 | Kanekawa | |
| 2013/0216871 A1 | 8/2013 | Lee | |
| 2013/0305391 A1 | 11/2013 | Haukom | |
| 2014/0035357 A1 | 2/2014 | Hausmann et al. | |
| 2014/0084817 A1 | 3/2014 | Bhavaraju | |
| 2014/0197681 A1 | 7/2014 | Iwashima | |
| 2014/0212695 A1* | 7/2014 | Lane | H01M 10/425 429/7 |
| 2014/0303812 A1 | 10/2014 | Avritch et al. | |
| 2014/0339371 A1 | 11/2014 | Yates et al. | |
| 2014/0342201 A1 | 11/2014 | Andres | |
| 2015/0019771 A1 | 1/2015 | Greef | |
| 2015/0115108 A1 | 4/2015 | Benson et al. | |
| 2015/0123622 A1 | 5/2015 | Yasui | |
| 2015/0263546 A1 | 9/2015 | Senoo | |
| 2015/0285165 A1 | 10/2015 | Steinwandel | |
| 2015/0339371 A1 | 11/2015 | Cao et al. | |
| 2015/0344156 A1 | 12/2015 | Vail, III | |
| 2015/0353192 A1 | 12/2015 | Morrison | |
| 2015/0358002 A1 | 12/2015 | Startin | |
| 2016/0047861 A1 | 2/2016 | Chen | |
| 2016/0107758 A1 | 4/2016 | Esteyne et al. | |
| 2016/0197386 A1 | 7/2016 | Moon et al. | |
| 2016/0236790 A1 | 8/2016 | Knapp | |
| 2016/0254576 A1 | 9/2016 | Burns | |
| 2016/0304214 A1 | 10/2016 | Himmelmann | |
| 2016/0347180 A1 | 12/2016 | Steffani | |
| 2016/0359329 A1 | 12/2016 | Kim et al. | |
| 2017/0001511 A1 | 1/2017 | Kulkarni | |
| 2017/0008418 A1 | 1/2017 | Ciampolini et al. | |
| 2017/0054314 A1 | 2/2017 | Tang | |
| 2017/0057650 A1 | 3/2017 | Walter-Robinson | |
| 2017/0066531 A1 | 3/2017 | McAdoo | |
| 2017/0126025 A1 | 5/2017 | Bando et al. | |
| 2017/0210229 A1 | 7/2017 | Brochhaus | |
| 2017/0210481 A1 | 7/2017 | Bak | |
| 2017/0214070 A1 | 7/2017 | Wang | |
| 2017/0253344 A1 | 9/2017 | Wangemann et al. | |
| 2017/0309093 A1 | 10/2017 | Feng | |
| 2017/0331163 A1 | 11/2017 | Ebner | |
| 2018/0012484 A1 | 1/2018 | Sakabe | |
| 2018/0022451 A1 | 1/2018 | Lim | |
| 2018/0024201 A1 | 1/2018 | Izawa | |
| 2018/0079530 A1 | 3/2018 | Wyrobek | |
| 2018/0105282 A1 | 4/2018 | Tweet | |
| 2018/0108188 A1 | 4/2018 | Canning | |
| 2018/0138476 A1 | 5/2018 | Yamazaki | |
| 2018/0138478 A1 | 5/2018 | Chan | |
| 2018/0170511 A1 | 6/2018 | Mores | |
| 2018/0198154 A1 | 7/2018 | Lee | |
| 2018/0229618 A1 | 8/2018 | Lee | |
| 2018/0237148 A1 | 8/2018 | Hehn et al. | |
| 2018/0268719 A1 | 9/2018 | Guan | |
| 2018/0283292 A1 | 10/2018 | Steinwandel | |

(56) References Cited

U.S. PATENT DOCUMENTS

| | | |
|---|---|---|
| 2018/0287234 A1 | 10/2018 | Melack et al. |
| 2018/0301765 A1 | 10/2018 | Knape |
| 2018/0321325 A1 | 11/2018 | Fortier |
| 2018/0358593 A1 | 12/2018 | Seo |
| 2018/0358671 A1 | 12/2018 | Halsey et al. |
| 2019/0006650 A1 | 1/2019 | Bryla |
| 2019/0019638 A1 | 1/2019 | Humphreys |
| 2019/0097203 A1 | 3/2019 | Kwag |
| 2019/0097204 A1 | 3/2019 | Liposky |
| 2019/0126774 A1 | 5/2019 | Demont |
| 2019/0135403 A1 | 5/2019 | Perry et al. |
| 2019/0212733 A1 | 7/2019 | Lan |
| 2019/0221814 A1 | 7/2019 | Shimizu |
| 2019/0252652 A1 | 8/2019 | Guillemard |
| 2019/0319448 A1 | 10/2019 | Pevear |
| 2019/0337409 A1 | 11/2019 | Demont et al. |
| 2020/0035967 A1 | 1/2020 | Yoon |
| 2020/0231047 A1 | 7/2020 | Demont |
| 2020/0339010 A1 | 10/2020 | Villanueva et al. |

FOREIGN PATENT DOCUMENTS

| | | |
|---|---|---|
| CN | 205377342 U | 7/2016 |
| DE | 102007054228 | 5/2009 |
| DE | 102013217458 | 3/2015 |
| DE | 102014200997 | 7/2015 |
| DE | 10 2016 109 277 | 11/2017 |
| FR | 2988522 | 9/2013 |
| JP | 2011-114961 | 6/2011 |
| JP | 2012-160347 | 8/2012 |
| JP | 2012-175823 | 9/2012 |
| JP | 2013-84444 | 5/2013 |
| KR | 10-1733159 | 5/2017 |
| WO | WO 94/14226 | 6/1994 |
| WO | WO 03/026201 | 3/2003 |
| WO | WO 2004/068694 | 8/2004 |
| WO | WO 2012/014348 | 2/2012 |
| WO | WO 2012/147150 | 11/2012 |
| WO | WO 2015/168320 | 11/2015 |
| WO | WO 2018/053680 | 3/2018 |
| WO | WO 2018/130488 | 7/2018 |
| WO | WO 2019/006469 | 1/2019 |
| WO | WO 2019/211810 | 11/2019 |
| WO | WO 2020/044134 | 3/2020 |

OTHER PUBLICATIONS

Saw et al., "Computational fluid dynamic and thermal analysis of Lithium-ion battery pack with air cooling", Applied Energy vol. 177, 2016, pp. 783-792.

H55 Products, https://www.h55.ch/products, date accessed Jan. 16, 2020, in 6 pages.

International Search Report and Written Opinion for International Application No. PCT/IB2020/053320, dated Jul. 6, 2020, in 16 pages.

Are modern aircraft provided with analog consoles in case of a software failure?—Aviation Stack Exchange, http://aviation.stackexchange.com/questions/3905/are-modern-aircraft-provided-with-analog-consoles-in-case-of-a-software-failure, dated 2015, in 2 pages.

Palmer, Ryan C., "Applying Human Factors Principles in Aviation Displays: A Transition From Analog to Digital Cockpit Displays in the CP140 Aurora Aircraft", Master's Thesis, University of Tennessee, dated Aug. 2007, in 121 pages.

Switches: How to switch between two DC power sources powering a motor on an electric vehicle?—Electric Engineering Stack Exchange, https://electronics.stackexchange.com/questions/151341/how-to-switch-between-two-dc-power-sources-powering-a-motor-on-an-electric-vehicle, dated 2015, in 3 pages.

Search Report for Swiss Patent Application No. 20190000073, dated May 28, 2019, in 4 pages.

International Search Report and Written Opinion for International Application No. PCT/IB2020/050520, dated Apr. 7, 2020, in 14 pages.

\* cited by examiner

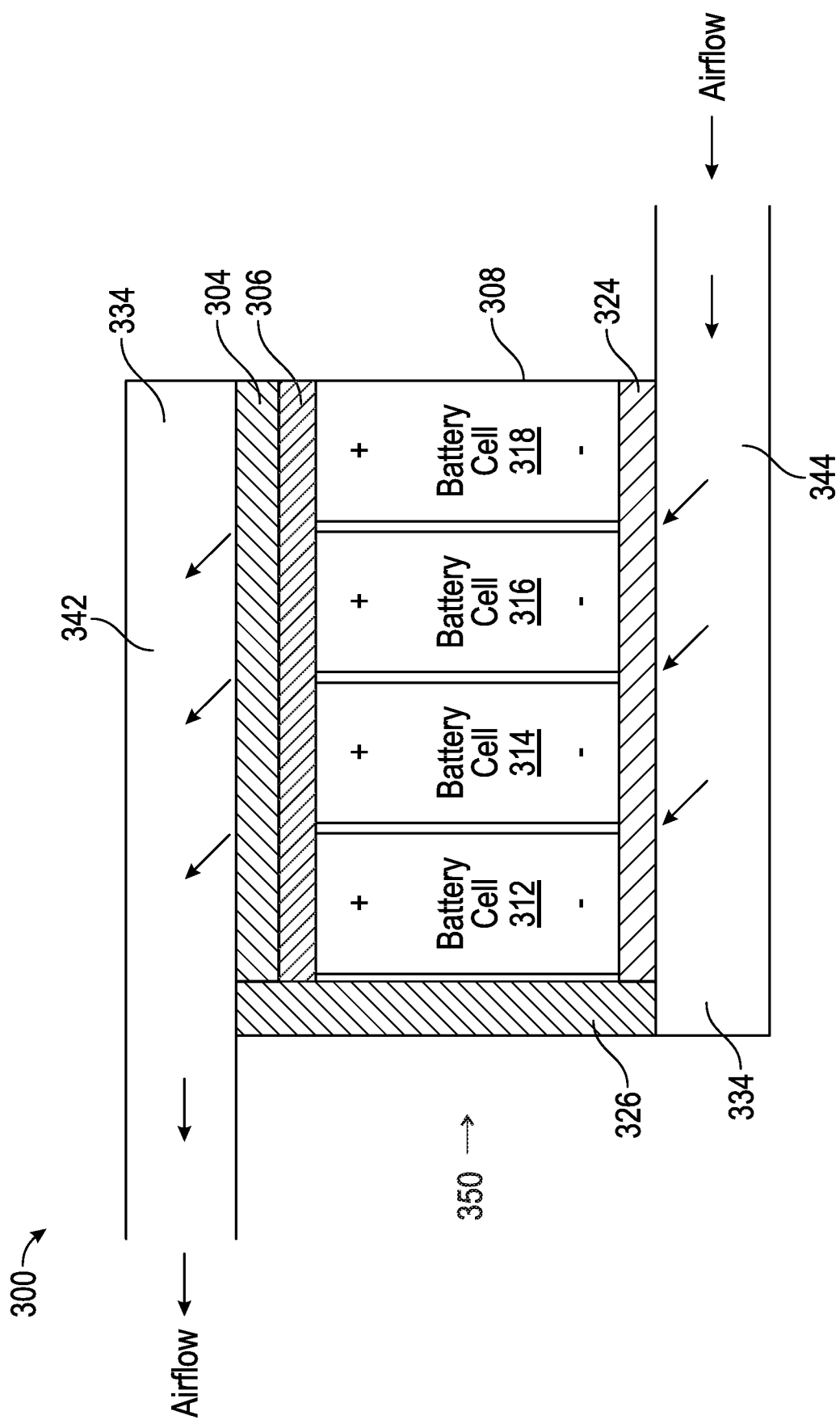

BATTERY MODULE FOR ELECTRICALLY-DRIVEN AIRCRAFT

RELATED APPLICATIONS

Any and all applications for which a foreign or domestic priority claim is identified in the Application Data Sheet of the present application are hereby incorporated by reference under 37 CFR 1.57.

FIELD

The present disclosure is related to a battery module for use in powering electric vehicles, such as electric or hybrid aircrafts.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

SUMMARY

Flying an aircraft, such an airplane, can be dangerous. Problems with the aircraft may result in injury or loss of life for passengers in the aircraft or individuals on the ground, as well as damage to goods being transported by the aircraft or other items around the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

Such certification standards have unfortunately had the effect of slowing commercial adoption and production of electric or hybrid aircraft. Electric or hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

The present disclosure provides simplified, yet robust, components and systems for an electric powered aircraft that simplify and streamline certifications requirements and reduce the cost and time required to produce a commercially viable electrically-driven aircraft.

In particular, safely powering an electric or hybrid aircraft can pose significant difficulties. A power system of an electric or hybrid aircraft can include numerous battery cells, and each of the battery cells can pose a serious safety risk, such as in the event that one or more of the battery cells overheat and catch fire (for instance, due to a manufacturing defect, aging, or abuse of the one or more battery cells). If a fire in one battery cell were to reach other battery cells, the other battery cells may catch fire and cause a chain reaction that would result in the aircraft suffering a catastrophic failure. Thus, the power system of an electric or hybrid aircraft should be carefully managed.

It is therefore an aim of the present disclosure to provide a solution to one or more of the above-mentioned problems of the prior art.

In particular, an aim of the present disclosure is to provide an electric power system for use in powering an electric vehicle, such as an electric aircraft, in which the consequences of one or more cells overheating or catching fire are less dramatic than in prior art electric power systems.

According to one aspect, those aims are achieved with a battery module that includes: a plurality of battery cells; a plurality of cell tubes configured to accommodate the plurality of battery cells within the plurality of cell tubes so that individual of the plurality of battery cells are positioned within individual of the plurality of cell tubes, each battery cell having a first electric pole and a second electric pole, a first (or top) conductive plate which mutually electrically connects the first poles of each of the plurality of battery cells, said first conductive plate comprising a plurality of first holes so that individual of the plurality of cell tubes are facing individual of the plurality of first holes, a plurality of first spacers, each first spacer being mounted in one of said first holes and configured to support one said cell tube and one said battery cell, said first spacer providing thermal and electrical isolation between the corresponding battery cell and the first conductive plate.

The battery module can comprise a second conductive plate which mutually electrically connects the second poles of each of the plurality of battery cells, said second conductive plate comprising a plurality of second holes so that individual of the plurality of cell tubes are facing individual of the plurality of second holes, a plurality of second spacers, each second spacer being mounted in one of said second holes and configured to support one said cell tube and one said battery cell, said second spacer providing thermal isolation between the correspond battery cell and the second conductive plate.

The first and/or second spacers can comprise one of the following materials: ceramic, plastic or fiber glass.

Each said first and/or second spacer can support a battery cell and a corresponding battery cell tube at a distance from each other, the plurality of battery cells being removable from the plurality of cell tubes.

The holes through the first conductive plate can permit combustion components to pass through the first conductive plate.

The holes through the second conductive plate can permit combustion components to pass through the second conductive plate.

The first conductive plate can comprise or consist of a printed circuit board comprising at least one sensor configured to monitor a voltage, a current, or an internal pressure of at least one of the plurality of battery cells.

The first conductive plate can comprise a first conductive layer, such as an aluminum layer, and an isolating layer.

The first conductive plate can further comprise a conductive layer with a plurality of PCB tracks for connecting electronic components.

The first conductive plate can comprise blind holes through said isolating layer for connecting said conductive layer to said battery cell or to the electronic components through wire bonding.

The battery module can further comprise a circuit board assembly electrically connected to said printed circuit board.

The circuit board assembly can be orientated parallel to the battery cells, in order to avoid obstruction of the heat and fames caused by the explosion of one battery cell.

The battery module can further comprise a controller mounted on the circuit board assembly and configured to control the plurality of battery cells.

The controller can be configured to communicate, via a connector, with an electronic device separate from the battery housing.

The total number of battery cells included in the plurality of battery cells is between 4 battery cells and 32 battery cells, inclusive.

The battery module can be part of a power system that comprises an exhaust channel configured to divert a fire from one of the plurality of battery cells toward an exhaust port of the vehicle housing to prevent the fire from spreading to another of the plurality of battery cells, the plurality of cell tubes being supported by said spacers with one first end of each cell tube being directed toward an exhaust channel.

The use of such an exhaust channel in accordance with the disclosure herein prevents heat or a fire at one or more battery cells from spreading to other battery cells.

The exhaust channel can divert and evacuate from the aircraft fumes, smoke, heat, steam, or combustion materials from a battery cell that has caught fire.

The battery module can be part of a power system that comprises an inlet channel arranged to direct an air flow through the battery housing, a second end of each of the plurality of cell tubes being directed toward said inlet channel.

The plurality of cell tubes can comprise aluminum, steel, or carbon.

The plurality of cell tubes can be arranged in at least two rows of cell tubes and at least two columns of cell tubes.

The present disclosure is also related to a battery module as described and/or claimed, in combination with the vehicle housing, the vehicle housing being configured to fly and supporting the battery housing so that an air flow passes through the battery housing when the vehicle housing is in motion.

Multiple battery modules may be connected. The battery modules are sometimes referred to as battery packs, or several mutually connected battery modules are referred to as battery packs. The battery modules can each include a battery housing that supports multiple battery cells electrically connected in parallel with one another. The battery modules can each be relatively lightweight rather than encapsulated in a heavy casing, such as a heavy metal casing, that would undesirably add weight to the aircraft. The battery cells of the multiple battery modules can be connected in series and/or parallel with one another to form a power source for the aircraft.

The plurality of cell tubes can be supported by the battery housing with one first end of each cell tube being directed toward the exhaust channel, the plurality of battery cells each being self-contained, the plurality of battery cells being removable from the plurality of cell tubes.

The cell tubes may have any shape or section, provided each cell tube can house one battery cell. A cell tube preferably prevents a direct line of sight form one battery cell to any neighbor battery cell, so that heat from one battery cell is reverberated by the inner surface of the cell tube in which the battery cell in housed and does not reach directly any other battery cell. In one preferred embodiment, each cell tube has a cylindrical shape with two open ends.

Because battery cells may fail in a predictable matter (such as tending to catch fire and explode from a positive terminal of the battery cells and last for around 10 seconds), the cell tubes act as individual battery housings to orient the multiple battery cells in the individual battery housings in a common direction with the positive terminals (sometimes referred to as cathodes) of the multiple battery cells being on a common side of the battery housing, for example facing the exhaust channel.

The cell tube can reinforce the side walls of the battery cell to prevent lateral explosion of a battery cell, and to direct the flames and heat toward an exhaust channel rather in the unlikely event of lateral explosion of a battery cell, thus reducing this risk of reaching other cells or components in the same battery module or other battery modules. Upon one of the battery cells catching fire, the fire from the battery cell may pass by or through an insulation layer (which may prevent the fire from reaching one or neighboring battery cells), enter the exhaust channel, and be diverted toward or to an exhaust port of the aircraft so that the fumes, smoke, heat, steam, or combustion materials may leave the aircraft.

The battery module may connect to an inlet channel arranged to direct an air flow through the battery housing and into the exhaust channel, a second end of each of the plurality of cell tubes being directed toward said inlet channel.

A plurality of cooling plates may be supported by the battery housing and thermally coupled to the plurality of cell tubes, at least one of the plurality of cooling plates comprising a plurality of holes through which the plurality of cell tubes extend, the plurality of cooling plates being configured to dissipate heat from the plurality of cell tubes.

A sensor may be configured to monitor a temperature of one of the plurality of cell tubes or one of the plurality of cooling plates.

A thermal fuse may mechanically and thermally couple one of the plurality of cooling plates to one of the plurality of cell tubes. Therefore, if one of the cell tube is overheating due to a fire or overheat in the cell housed by this cell tube, the thermal fuse may melt and prevents transmission of heat to other cells through the cooling plate.

The plurality of cooling plates may be made of aluminum foam. Aluminium foam provides a very large surface for exchange of heat between the air and the cooling plate.

The battery housing, the plurality of cell tubes, and the plurality of cooling plates are configured to evenly distribute heat so that the plurality of battery cells age at a common rate. The heat is evenly distributed when the battery cells are operating normally, i.e. not overheating. The heat may not be evenly distributed when the battery cells are overheating and at least one thermal fuses is melting. A heat is considered to be evenly distributed when the difference of temperature between battery cells of the same battery module does not exceed 20° C., preferably 10° C., preferably 5° C.

The battery module may comprise an isolation positioned between (i) a conductive plate and (ii) the plurality of cell tubes, the isolation providing electrical or thermal insulation.

The conductive plate may be configured to electrically connect the plurality of battery cells in parallel with one another.

The plurality of cell tubes may be arranged in at least two rows of cell tubes and at least two columns of cell tubes.

The battery housing may be configured to mechanically couple to additional battery housings on opposite sides of the battery housing, the battery housing and the additional battery housings each having a common structure, the plurality of battery cells being configured to electrically couple in series or parallel with additional battery cells of the additional battery housings to together power the motor.

The battery module may comprise a circuit board assembly comprising a sensor configured to monitor a voltage, a current, a temperature or an internal pressure of at least one of the plurality of battery cells; and a controller mounted on the circuit board assembly and configured to control an energy transfer from the plurality of battery cells responsive to the voltage, the current, or the internal pressure.

The controller may be configured to communicate, via a connector, with an electronic device separate from the battery housing.

The total number of battery cells included in the plurality of battery cells is between 4 battery cells and 32 battery cells, inclusive.

A vehicle housing may be configured to fly and supporting the battery housing so that an air flow passes through the battery housing toward an exhaust channel of the vehicle housing when the vehicle housing is in motion.

According to another aspect, a battery module can include: a plurality of battery cells; a plurality of cell tubes configured to accommodate the plurality of battery cells within the plurality of cell tubes so that individual of the plurality of battery cells are positioned within individual of the plurality of cell tubes, each battery cell having a first electric pole and a second electric pole; and a first conductive plate comprising or consisting of a printed circuit board that includes a first conductive layer and an isolating layer, the isolating layer comprising at least one blind hole for wire-bonding the conductive layer to the battery cell.

BRIEF DESCRIPTION OF THE DRAWINGS

FIGS. 3A and 3B illustrate an example power system usable in a vehicle, such as the aircraft of FIG. 1A;

DETAILED DESCRIPTION

System Overview

Figure 1A:
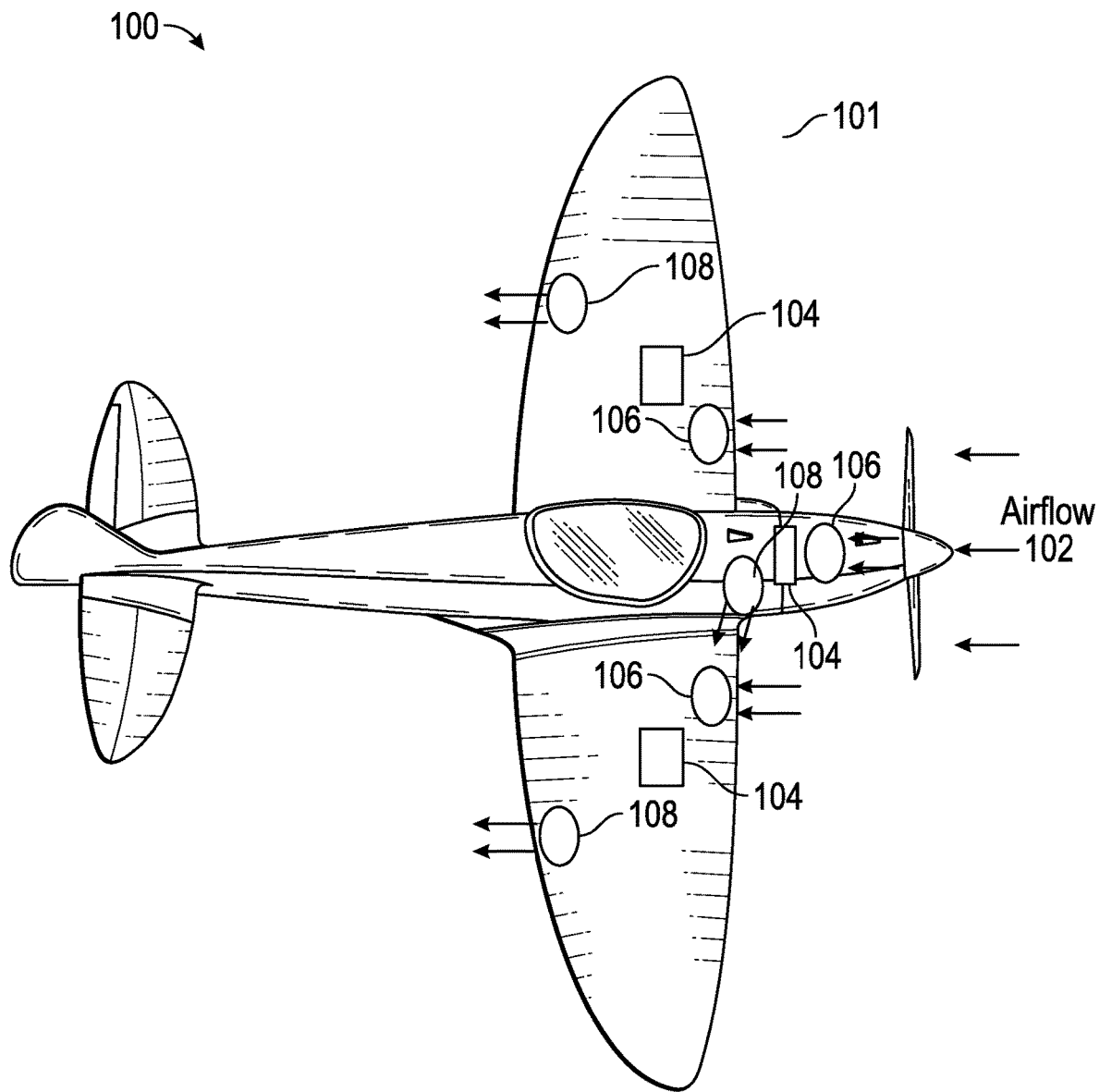
FIG. 1A illustrates an example aircraft, such as an electric or hybrid aircraft.
Figure 1B:
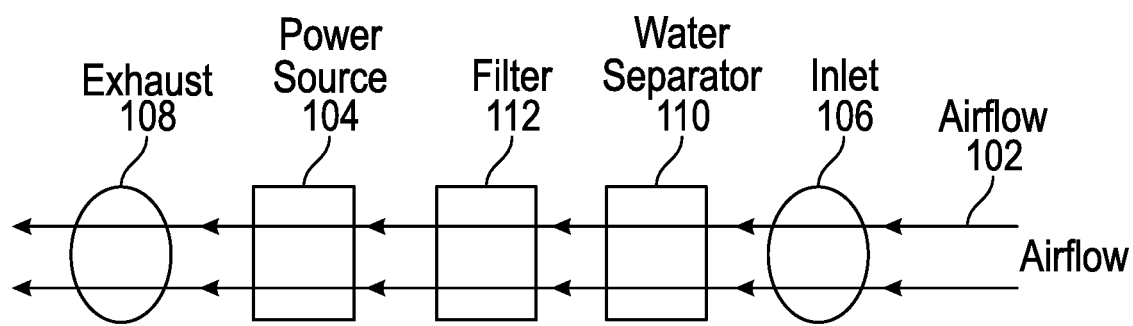
FIG. 1B illustrates airflow through the aircraft of FIG. 1A.

FIG. 1A illustrates an aircraft 100, such as an electric or hybrid aircraft, and FIG. 1B illustrates airflow 102 through the aircraft 100. The aircraft 100 has an aircraft housing 101. The aircraft can include power sources 104, inlets 106, exhausts 108, one or more water separators 110, and one or more filters 112. The inlets 106 can include inlet ports proximate to an exterior of the aircraft 100 and inlet channels extending from the inlet ports into the aircraft 100. The exhausts 108 can include exhaust ports proximate to the exterior of the aircraft 100 and exhaust channels extending from the exhaust ports into the aircraft 100.

During operation of the aircraft 100 or when the power sources 104 may be supplying power, the airflow 102 can flow into the aircraft 100 from one of the inlets 106 (which can be locations of relatively higher pressure), pass in or around one or more of the power sources 104, and next pass out one of the exhausts 108 (which can be locations of relatively lower pressure). The airflow 102 can cool the one or more the power sources 104 or facilitate expulsion of heat or combustion components from the aircraft 100 in the event of a fire at the one or more of the power sources 104. The air of the airflow 102 can be filtered (for example, by one of the filters 112) as the air passes through the aircraft 100. Water or other impurities may be removed from the air (for example, by one of the one or more water separators 110) as the airflow 102 passes through the aircraft 100.

As described herein, the aircraft 100 can include an electric power system that includes integrated fire relief channels so that heat created by a fire or explosion of one of the power sources, such as the power sources 104, may diverted through an exhaust channel to an exhaust, such as an exhaust port of the exhausts 108.

The aircraft 100 can include one or more components or features of aircrafts disclosed in (i) U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," (ii) U.S. Pat. No. 10,322,824, issued Jun. 18, 2019, titled "CONSTRUCTION AND OPERATION OF ELECTRIC OR HYBRID AIRCRAFT," the entire disclosures of which are hereby incorporated by reference.

Figure 1C:
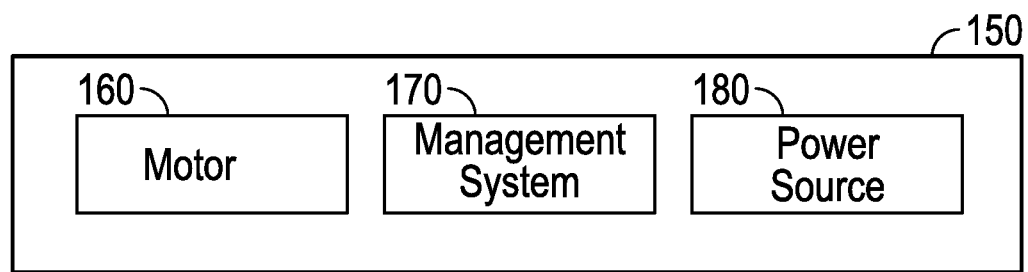
FIG. 1C illustrates a simplified block diagram of the aircraft of FIG. 1A.

FIG. 1C illustrates a simplified block diagram of an aircraft 150, which can be an implementation of the aircraft 100 of FIG. 1A. The aircraft 150 includes a motor 160, a management system 170, and a power source 180. The power source 180 can be an implementation of one or more of the power sources 104. The motor 160 can be used to propel the aircraft 150 and cause the aircraft 150 to fly and navigate. The management system 170 can control and monitor the components of the aircraft 150, such as the motor 160 and the power source 180. The power source 180 can power the motor 160 to drive the aircraft 150 and power the management system 170 to enable operations of the management system 170. The management system 170 can include one or more controllers as well as other electronic circuitry for controlling and monitoring the components of the aircraft 150.

The motor 160 can be or include an electrical motor, such as a DC motor, a one phase AC motor, or a three phase AC motor. The motor 160 can include an electric brushless motor. The motor 160 can include more than one motor. The motor 160 can move the aircraft 150 and drive a (thrust-generating) propeller or a (lift-generating) rotor. The motor 160 can function as a generator. The motor 160 can include multiple motors, such as electric motors. The aircraft 150 can include one or a plurality of electric motors and, optionally, one or a plurality of thermic motors, and function as a pure electric airplane or as a hybrid airplane.

The power source 180 can store electrical energy and include one or more battery modules that each include one or more battery cells. The battery cells of a battery module may be electrically connected in series and/or parallel with one another to deliver a desired voltage and current from the battery module. Two or more battery modules can be electrically connected in series and/or in parallel to form a battery pack and deliver a desired voltage and current from the two or more battery modules. The aircraft can comprise two or more battery packs as power source. The battery cells can be lithium-ion (Li-Ion) battery cells or lithium-polymer (Li-Po) battery cells.

Figure 2:
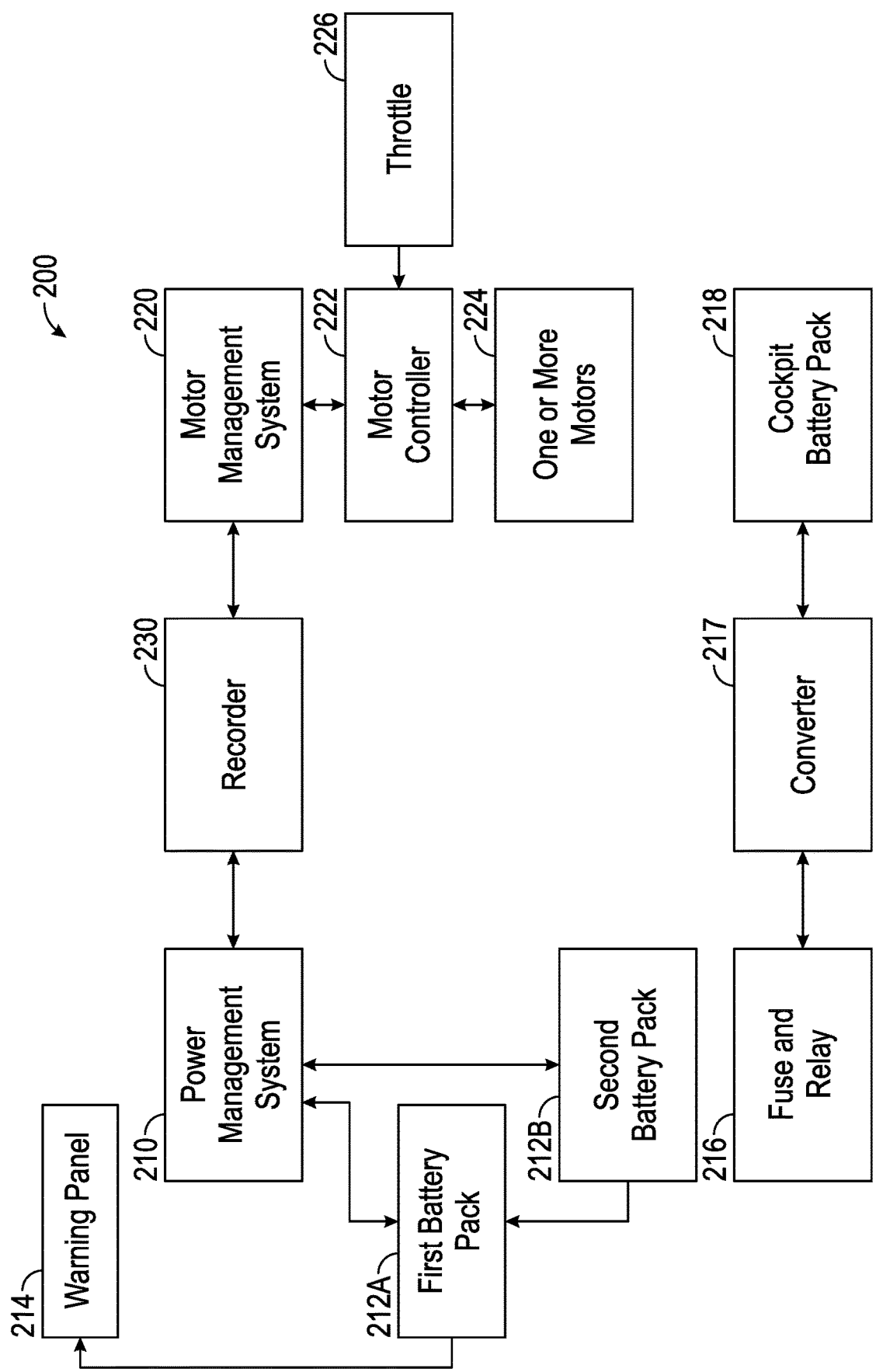
FIG. 2 illustrates an example operation system for an aircraft, such as the aircraft of FIG. 1A.

FIG. 2 illustrates an operation system 200 of an aircraft, such as the aircraft 100 of FIGS. 1A, 1B, and 1C. The operation system 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226. The one or more motors 224 can be an implementation of the motor 160, the first battery pack 212A and the second battery pack 212B can be an implementation of the power sources 104 or the power source 180, and the remaining components can be an implementation of the management system 170.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B. Features around construction and operation of the power management system 210 are described in greater detail in U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," which is incorporated herein by reference.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller 222 may further operate according to instructions from the throttle 226 that may be controlled by a pilot of the aircraft.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 may include the same or similar computer hardware, or a single hardware may perform both functions.

Power and Fire Management Systems

FIG. 3A illustrates a power system 300 usable in a vehicle, such as the aircraft 100, and prior to a fire. The power system 300 includes an exhaust channel 342, an inlet channel 344, and a battery module 350. The battery module includes a battery housing 308 that supports battery cells 312, 314, 316, and 318. The exhaust channel 342 can be coupled or positioned proximate to the battery housing to prevent a fire in one of the battery cells 312, 314, 316, or 318 from spreading to another of the battery cells 312, 314, 316, or 318. One or a plurality of battery modules 350 with battery housings 308 and the associated battery cells 312, 314, 316, and 318 can together form a battery pack and be part of a power source for the vehicle, such as the power source 180.

The battery housing 308 can support a first conductive plate 306 (top plate), an optional insulative material 304, and the battery cells 312, 314, 316, and 318. The battery housing 308 can at least partially surround the top plate 306, the insulative material 304, and the battery cells 312, 314, 316, and 318. The battery housing 308 can be formed of or include plastic and can have an outer shape substantially shaped as a rectangular prism or cube. The battery housing 308 can support one or more additional battery cells (not shown) within the battery housing 308 and alongside the battery cells 312, 314, 316, and 318 so that the battery housing 308 may support 8, 9, 10, 12, 16, or more battery cells, for example.

The conductive top plate 306, the optional insulative material 304, and the battery cells 312, 314, 316, and 318 can be layered so that the top plate 306 (or at least a portion thereof) may be positioned between the insulative material 304 and the battery cells 312, 314, 316, and 318. In addition or alternatively, the insulative material 304 (or at least a portion thereof) can be positioned between the top plate 306 and the battery housing 308.

The top plate 306 can electrically connect all battery cells 312, 314, 316, and 318 in the battery module 350. As illustrated in FIG. 3A, the battery cells 312, 314, 316, and 318 can be oriented in the same direction such that the top plate 306 contacts or electrically connects to positive terminals of the battery cells 312, 314, 316, and 318, thereby electrically connecting the battery cells 312, 314, 316, and 318 in parallel with one another. In other implementations, the top plate 306 can contact a negative terminal of the battery cells 312, 314, 316, and 318, or one or more of the battery cells 312, 314, 316, or 318 can be oriented in an opposite direction from another of the battery cells 312, 314, 316, or 318.

Although not illustrated in FIG. 3A, multiple of the top plates 306 can be provided. For example, multiple conductive bars as top plates can each be arranged for electrically connecting a subset of the battery cells 312, 314, 316, and 318. As the multiple conductive bars may cover a smaller surface area than the top plate 306, a weight of the power system 300 can be reduced by use of the multiple conductive bars.

The top plate 306 can be electrically conductive and composed of one or more conductive materials. For example, the top plate 306 can include copper, aluminum, steel, silver, gold, zinc, nickel, iron, platinum, or a combination thereof. In other implementations, the top plate 306 may not be conductive. The top plate 306 or at least portions thereof can withstand the temperature of a fire of one of the battery cells 312, 314, 316, and 318 so that a fire from one does not burn through the top plate 306 or the at least portions thereof. The top plate 306 may allow the fire of one of the battery cells 312, 314, 316, and 318 to pass through the top plate 306 (such as through a hole in or on the top plate 306) so that the fire is directed to the exhaust channel 342 but does not reach the other of the battery cells 312, 314, 316, and 318.

The battery housing 308 can support a second conductive plate 324 (also referred to as a base plate) that may electrically connect negative terminals (sometimes referred to as anodes) of the battery cells 312, 314, 316, and 318. The base plate 324 can be electrically conductive and composed of one or more conductive materials, which may be similar to or the same as the top plate 306. In other implementations, the base plate 324 may not be conductive.

The base plate 324 may allow the fire of one of the battery cells 312, 314, 316, and 318 to pass through the base plate 324 (such as through a hole in or on the base plate 324) so that the fire does not reach the other of the battery cells 312, 314, 316, and 318.

As with the top plate 306, multiple of the base plates 324 can be provided although not illustrated in FIG. 3A. For example, multiple conductive bars as base plates can each be arranged for electrically connecting a subset of the battery cells 312, 314, 316, and 318. As the multiple conductive bars may cover a smaller surface area than the base plate 324, a weight of the power system 300 can be reduced by use of the multiple conductive bars. The battery housing 308 can support a housing circuit board assembly 326. The housing circuit board assembly 326 can control the transfer of power from or to the battery cells 312, 314, 316, or 318, as well as include one or more sensors for monitoring a voltage, a temperature, or an internal pressure of the battery cells 312, 314, 316, or 318 or another associated characteristic. The housing circuit board assembly 326 can provide galvanic isolation with respect to other components. Although the housing circuit board assembly 326 is illustrated on a side of the battery housing 308, the housing circuit board assembly 326 can be located or positioned elsewhere in, on, or proximate to the battery housing 308, such as one or more of its bottom or another side. The housing circuit board assembly 326 can be within or out of the path of a potential fire from the battery cells 312, 314, 316, and 318. The housing circuit board assembly 326 may be a thermal isolator. As will be described, an additional circuit board can provided, for example as part of the top plate 306. Multiple circuit boards can be mutually connected with electric connectors.

The battery cells 312, 314, 316, and 318 can store electrical energy. The electrical energy can be utilized for driving one or more motors, such as the motor 160. The one or more motors can propel a vehicle housing that is configured to fly. The battery cells 312, 314, 316, and 318 can be used to additionally or alternatively power other components supported by the vehicle housing.

The battery cells 312, 314, 316, and 318 can electrically be connected in series and/or in parallel to deliver a desired voltage and current. One or more of the battery cells 312, 314, 316, and 318 can be Li-Ion or Li-Po battery cells. The battery cells 312, 314, 316, and 318 can be substantially shaped as a cylinder.

The insulative material 304 can be fire retardant or not heat conductive. As illustrated, the insulative material 304 can be on top of the top plate 306 and prevent a fire from leaving the exhaust channel 342. For example, if one of battery cells 312, 314, 316, and 318 combusts and causes a fire, the fire can pass or burn through the top plate 306 or the insulative material 304 on its way into the exhaust channel 342, and after the fire enters the exhaust channel 342, the top plate 306 and the insulative material 304 can prevent the fire from leaving the exhaust channel 342 and reaching the other of the battery cells 312, 314, 316, and 318. The insulative material 304 may not be included in the battery module 350 in certain embodiments.

The top plate 306 and/or the insulative material 304 can include one or more holes or valves, such as one hole or valve above each of the battery cells 312, 314, 316, and 318, to permit the fire to pass through to the exhaust channel 342 but not pass back into one of the other holes or valves and into another of the battery cells 312, 314, 316, and 318. The top plate 306 or the insulative material 304 can include one or more holes or valves for allowing air to flow through the power system 300. For example, air can flow in through the inlet channel 344, pass through the battery housing 308 (for instance, around the battery cells 312, 314, 316, and 318 or from their negative to positive terminals), around or through the top plate 306 (for instance, such as through one or more holes therein) or the insulative material 304 (for instance, such as through one or more holes therein), and flow out through the exhaust channel 342. The top plate 306 and/or the insulative material 304 can additionally or alternatively include one or more separate regions of lower integrity (such as above each of the battery cells 312, 314, 316, and 318 and that may be prone to weakening by a fire) and higher integrity (such as not above each of the battery cells 312, 314, 316, and 318 and that may not be prone to weakening by a fire) so that a fire may weaken one region of lower integrity and then pass through the weakened region to the exhaust channel 342 but not burn through one or more other regions of lower or higher integrity and pass into another of the battery cells 312, 314, 316, and 318. The top plate 306 and/or the insulative material 304 can include at least some holes (for example, so that air can pass from the inlet channel 344 to the exhaust channel 342, or from the exhaust channel 342 to the inlet channel 344) and include at least some regions of lower integrity (for example, so that fire or air may pass through the top plate 306 or the insulative material 304 and exhaust through the exhaust channel 342 or the inlet channel 344).

Figure 3B:
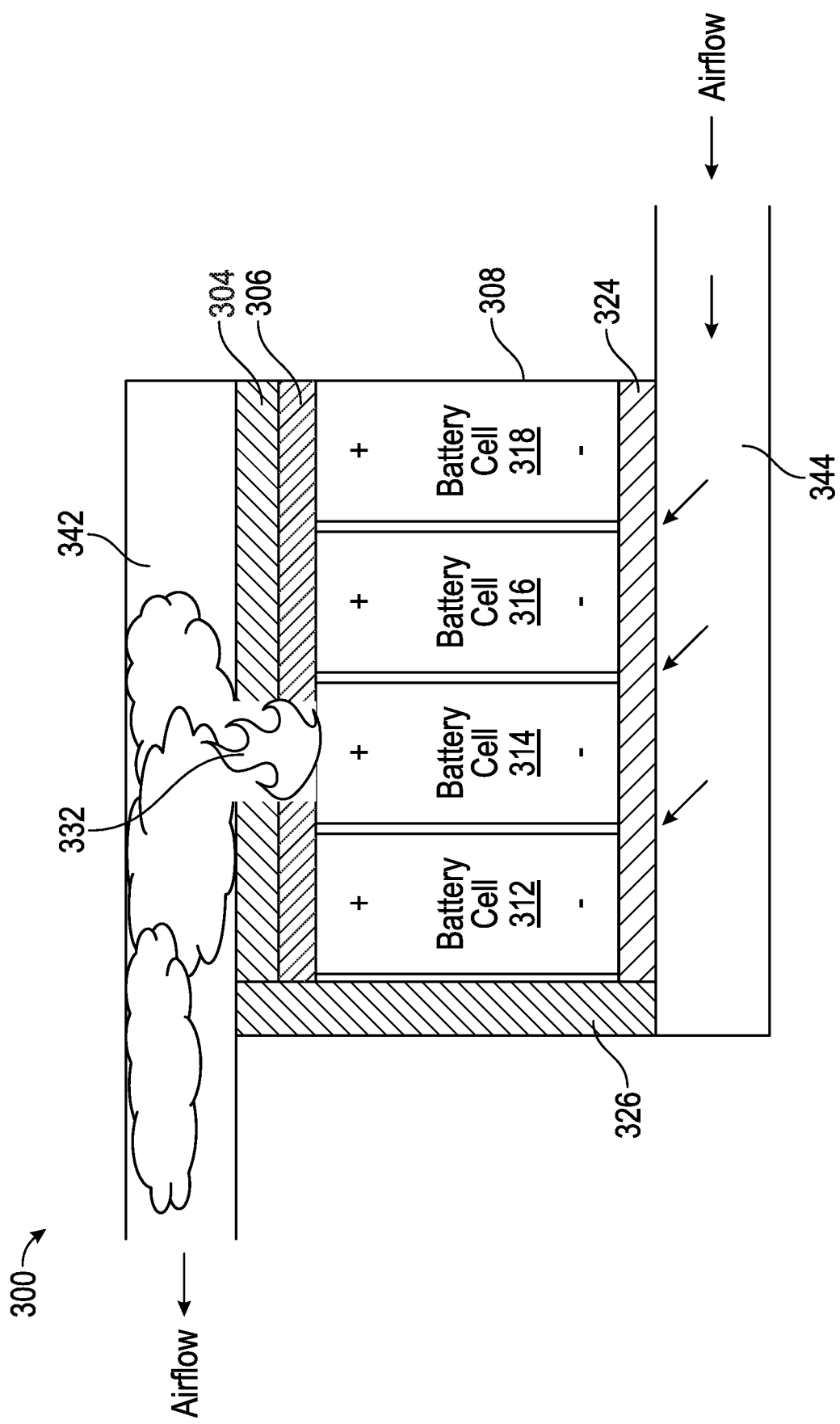

The exhaust channel 342 or the inlet channel 344 can include an at least partially enclosed space 334. As illustrated by FIG. 3B, after a fire 332 in one battery cell, such as the battery cell 314, the at least partially enclosed space 334 can transfer combustion products, fumes, smoke, heat, or steam from the fire 332 toward or to an exhaust port of the vehicle housing, such as one of the exhausts 108. As illustrated, to facilitate the evacuation of the combustion products, fumes, smoke, heat, steam, or air through the exhaust channel 342, air can be funnelled through the aircraft. For example, air from outside of the aircraft (for instance, in front of the aircraft) can enter through the inlet channel 344, pass at least partially around one or more of the battery cells 312, 314, 316, or 318, and exit through the exhaust channel 342 (for instance, behind the aircraft, such as behind a wing). A configuration such as this can create a vacuum for airflow, for example, where the air enters through a higher pressure inlet (for instance, the inlet channel 344) and exits through a lower pressure outlet (for instance, the exhaust channel 342). The low pressure of the exhaust channel 342 can facilitate the flow of air through the power system 300, in that the lower pressure serves to suck the air or combustion components from the exhaust channel outside of the aircraft. The power system 300 can, in some implementations, include the inlet channel 344 or the exhaust channel 342 but may not include both. The power system 300 can include a fan or other air circulating device (not shown) to facilitate the evacuation of the combustion products, fumes, smoke, heat, steam, or air through the exhaust channel 342 or into the inlet channel 344.

During normal operation, air from the inlet channel 344 can flow between the battery cells 312, 314, 316, or 318 and cool the battery cells 312, 314, 316, or 318 in the battery module 350.

The battery housing 308 (as well as a vehicle housing in which the battery housing 308 may be positioned) can permit an air flow through the battery housing 308 during operation of the vehicle so that air may tend to flow from negative terminals of the battery cells 312, 314, 316, and 318 to the positive terminals. This may help to facilitate a flow of the combustion products, fumes, smoke, heat, or steam from the battery cells 312, 314, 316, and 318 into the exhaust channel 342 and towards or to one or more exhaust ports. Air flow through the battery housing 308 may additionally or alternatively cool the battery cells 312, 314, 316, or 318 as it flows through the battery housing 308. Accordingly, air flow through the power system 300 may have a dual purpose of cooling the battery cells 312, 314, 316, and 318 and facilitating the exhaust of combustion products, fumes, smoke, heat, or steam if one or more of the battery cells 312, 314, 316, and 318 catch fire. This dual purpose may be desirably performed without the additional weight of include two different systems for the purposes of cooling the battery cells 312, 314, 316, and 318 and facilitating the exhaust of combustion products, fumes, smoke, heat, or steam if one or more of the battery cells 312, 314, 316, and 318 catch fire.

Figure 3C:
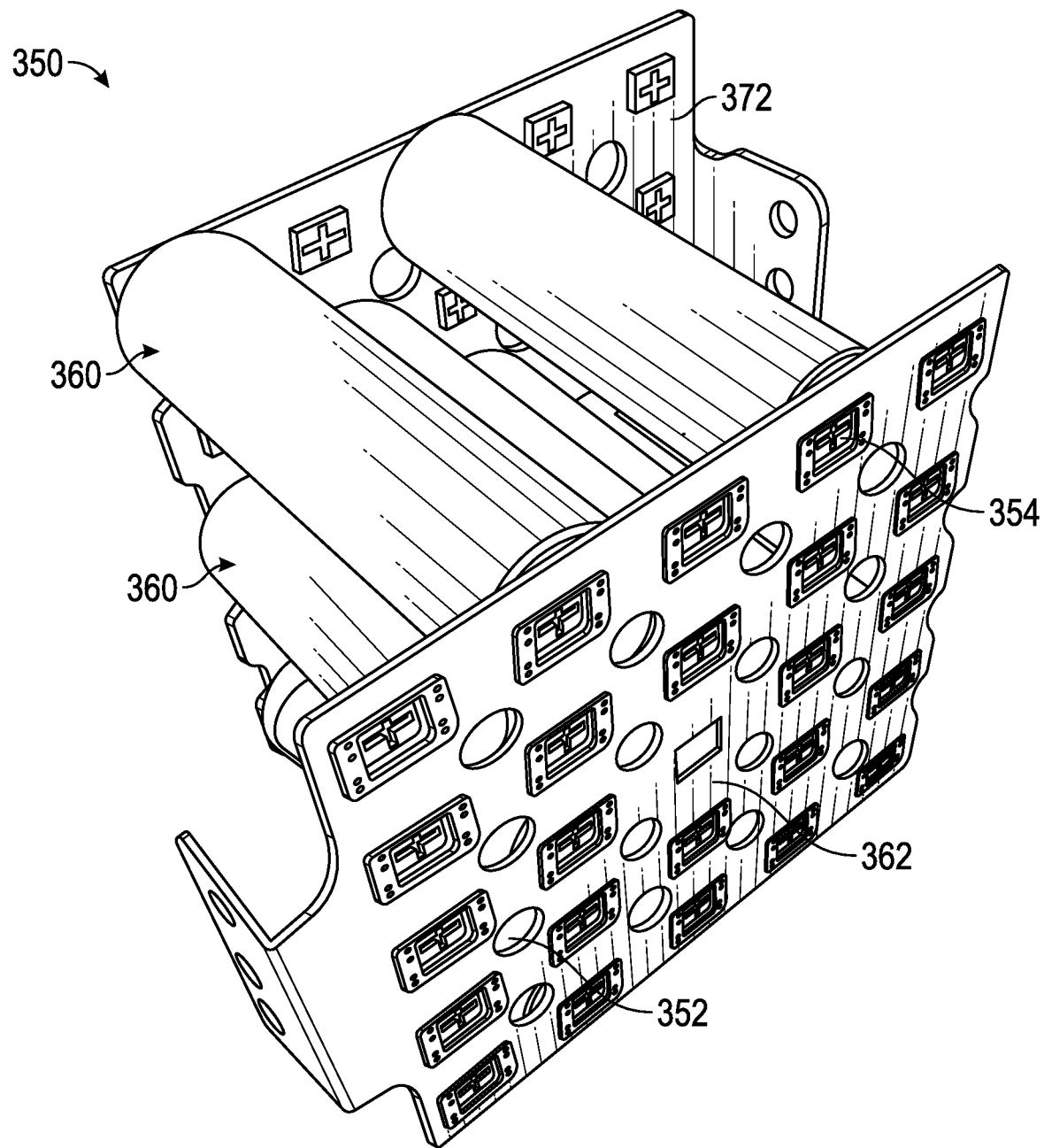
FIG. 3C illustrates example components of a power system, such as the power system of FIGS. 3A and 3B.

FIG. 3C illustrates example components of an embodiment of the battery module 350. As shown, battery cells 360 can be positioned proximate to a top plate 362 (also referred to as conductive plate). The top plate 362 can include air outlets 352 (for instance, holes) that are positioned along spaces between the battery cells 360. The air outlets 352 can permit air to pass by the battery cells 360 as described herein. On an opposite side of the battery cells 360 from the top plate 362, a bottom plate 372 (also referred to as base plate) can be positioned proximate to the battery cells 360 and can be the same as or similar to the top plate 362.

Furthermore, the top plate 362 can include, or be coupled to, one or more regions of lower integrity (such as a first region of lower integrity 354), and individual regions of lower integrity may be separated from other regions of lower integrity by regions of higher integrity. The one or more regions of lower integrity can be located throughout the top plate 362, and may be positioned above the battery cells 312, 314, 316, or 318, above spaces between the battery cells, or a combination thereof. The regions of lower integrity can include a tab configured to be shifted away from a battery cell, should the battery cell explode or catch fire. The tab can include nickel, copper, or aluminum.

Figure 4:
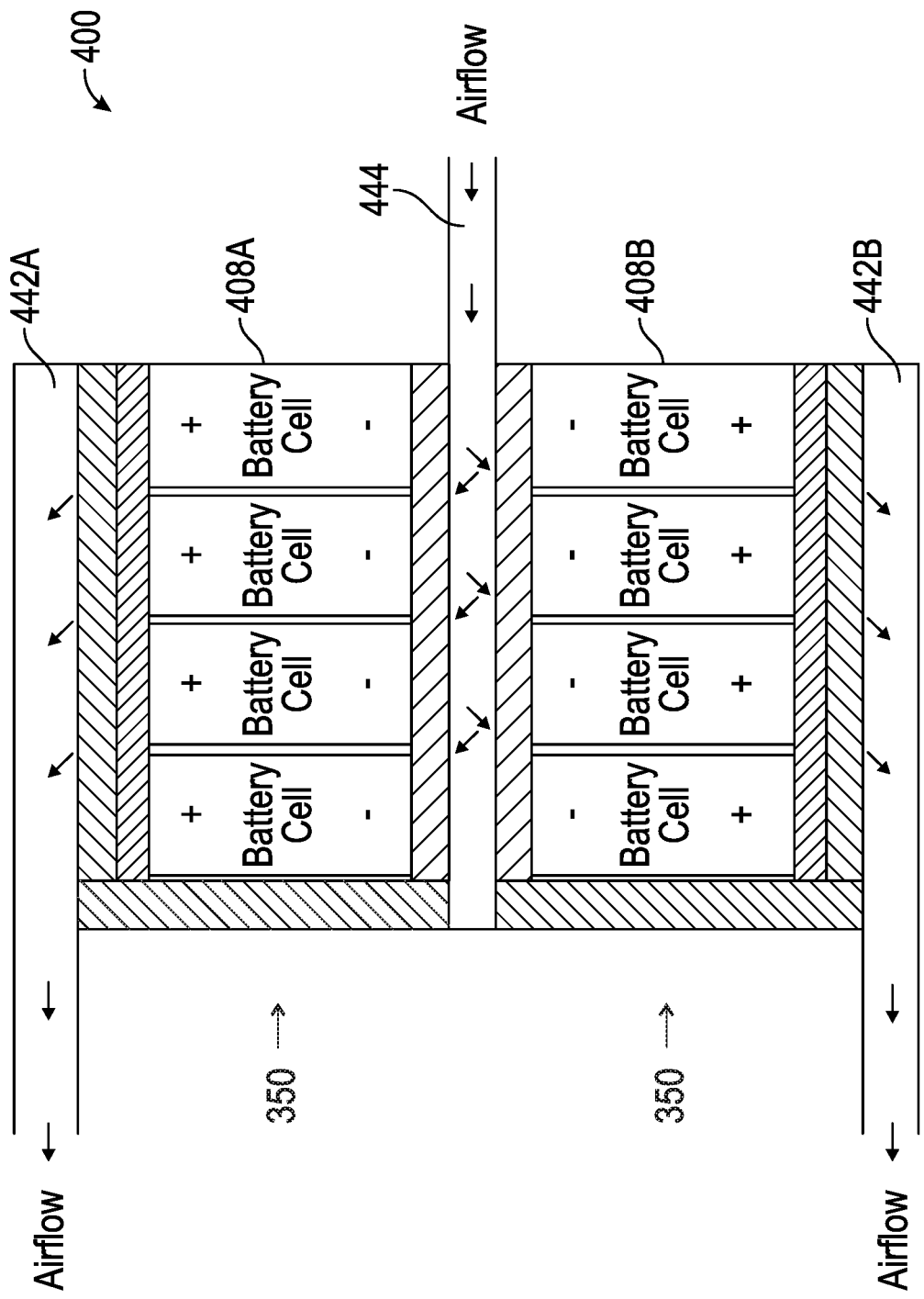
FIGS. 4 and 5 illustrate additional example power systems usable in a vehicle, such as the aircraft of FIG. 1A.

FIG. 4 illustrates a power system 400 usable in a vehicle, such as the aircraft 100. The power system 400 can be similar to the power system 300 but may include two battery modules 350 in two battery housings (a first battery housing 408A and a second battery housing 408B) rather than a single battery module 350 in one battery housing (the battery housing 308) and may include two exhaust channels (a first exhaust channel 442A and a second exhaust channel 442B) rather than a single exhaust channel (the exhaust channel 342). The power system 400 may include one or more inlet channels 444 (for instance, similar to inlet channel 344) into which air can flow, such as from outside of the aircraft. The first battery housing 408A and the second battery housing 408B can each be similar to or the same as the battery housing 308 and may, although not illustrated, be physically connected to one another. The first exhaust channel 442A and the second exhaust channel 442B can each be similar to or the same as the exhaust channel 342 and divert combustion products, fumes, smoke, heat, or steam from a fire toward or to one or more exhaust ports of the vehicle housing, such as one of the exhausts 108. The battery cells of the first battery housing 408A and the second battery housing 408B can be electrically connected in parallel or series with one another and can together be part of a power source for the vehicle, such as one of the power sources 104 or the power source 180.

Figure 5:
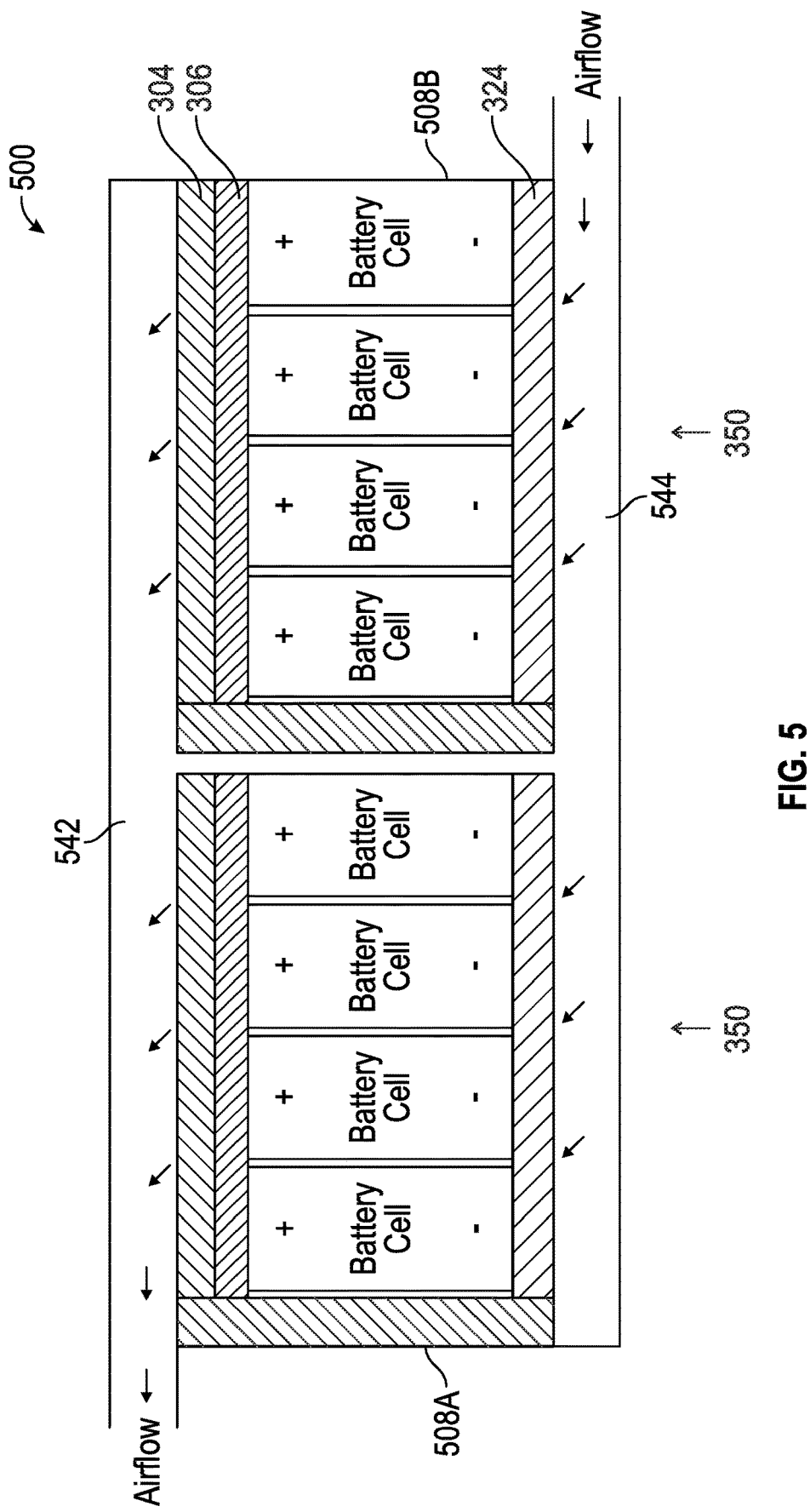

FIG. 5 illustrates a power system 500 usable in a vehicle, such as the aircraft 100. The power system 500 can be similar to the power system 300 but may include two battery modules 350 in two battery housings (a first battery housing 508A and a second battery housing 508B) rather than a single battery module 350 in a single battery housing (the battery housing 308) that may be coupled or positioned proximate to an exhaust channel 542 or an inlet channel 544. The first battery housing 508A and the second battery housing 508B can each be similar to or the same as the battery housing 308 and may, although not illustrated, be physically connected to one another. The exhaust channel 542 can be similar to or the same as the exhaust channel 342 and divert combustion products, fumes, smoke, heat, or steam from a fire 332 toward or to an exhaust port of the vehicle housing, such as one of the exhausts 108. The inlet channel 544 and exhaust channel 542, together with top plates (conductive plates) or insulative materials included in the first battery housing 508A and the second battery housing 508B, can prevent a fire in one of the battery cells included in the first battery housing 508A and the second battery housing 508B from spreading to another of the battery cells included in the first battery housing 508A and the second battery housing 508B. The battery cells of the first battery housing 508A and the second battery housing 508B can be electrically connected in parallel and/or series with one another, for example through the top plate 306 and through the base plate 324, and can together be part of a power source for the vehicle, such as one of the power sources 104 or the power source 180.

Although FIG. 4 illustrates two physically-parallel battery housings coupled or proximate to two exhaust channels, this disclosure can be extended to additional battery housings coupled or proximate to additional exhaust channels that are physically parallel with the power system 400. Although FIG. 5 illustrates two battery housings coupled or proximate to one exhaust channel, this disclosure can be extended to additional battery housings coupled or proximate to the one exhaust channel. Moreover, the features of this paragraph can be combined to construct multiple parallel or similar exhaust channels that may individually provide cooling and divert combustion products, fumes, smoke, heat, or steam from fires in multiple battery housings of any type disclosed in this document, toward or to one or more exhaust ports of the vehicle housing.

FIG. 6A to 6G illustrates example components of a battery module 800 (sometimes referred to as battery pack, or which could be part of a battery pack comprising a plurality of such battery modules). The battery module 800 can be at least a partial implementation of the power system 300 of FIGS. 3A and 3B. Features and advantages described or illustrated in relation with the battery modules 350 of FIG. 3A, 3B, 4 or 5 could be combined with the additional features and advantages described or illustrated in relation with the battery modules 800 of FIGS. 6A to 6G, unless otherwise described. Furthermore, the battery module 800 may be used in place of or alongside one or more of the battery modules 350 described with respect to FIGS. 3A, 3B, 4, and 5.

Figure 6A:
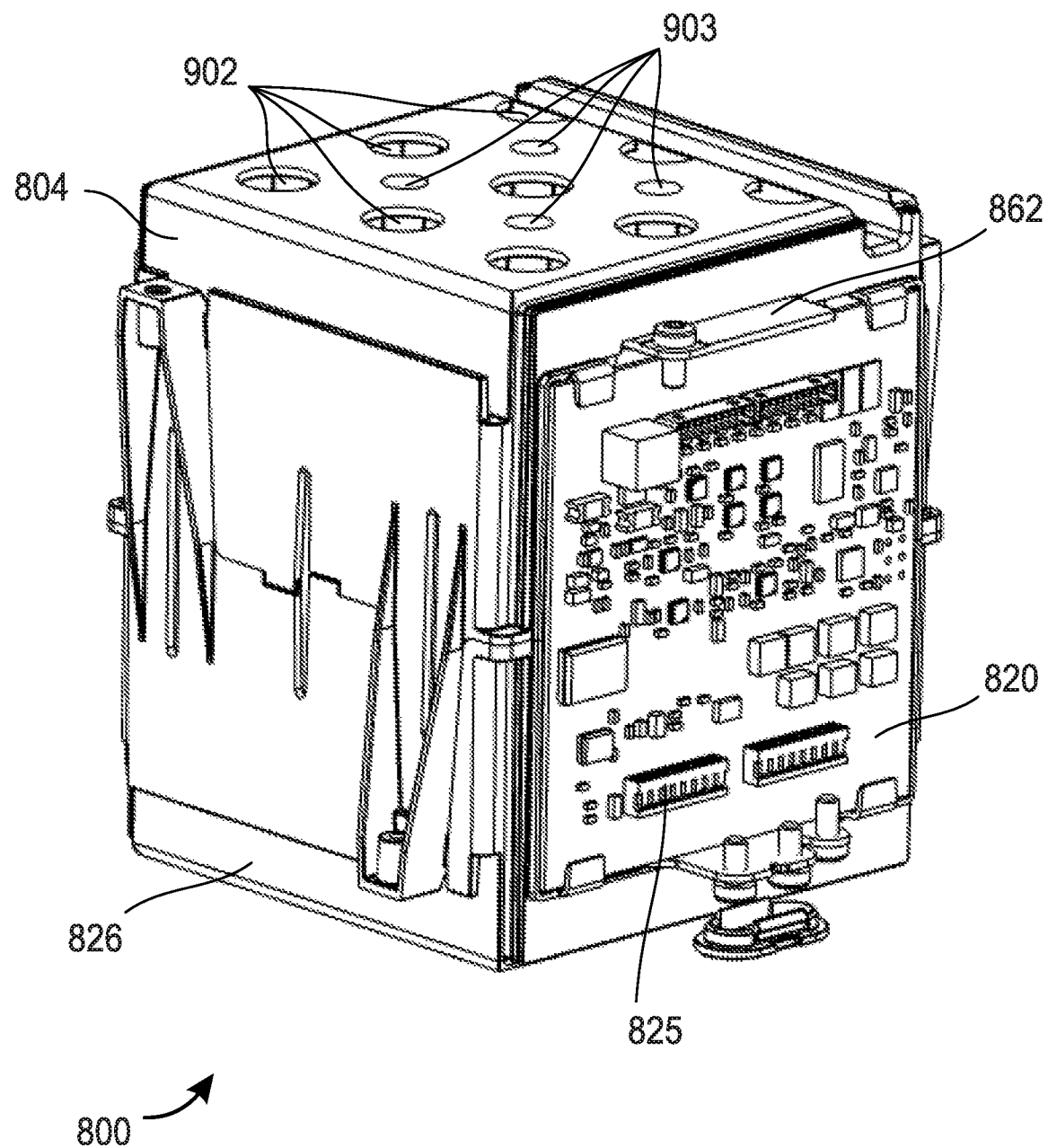
FIGS. 6A, 6B, 6C, 6D, 6E, 6F and 6G illustrate an example battery module usable in a vehicle, such as the aircraft of FIG. 1A.

FIG. 6A illustrates the battery module 800 completely assembled, while FIGS. 6B to 6G illustrate various parts or sub-assemblies of the battery module 800 with successively more sub-parts being removed to show the inner components of the battery module 800.

The battery module 800 can be constructed and disposed to facilitate a controlled expulsion of heat or combustion components from a battery cell of the battery module 800 that catches fire so that the heat or combustion components does not reach one or more other battery cells of the battery module 800 or another component of the vehicle that may be unable to withstand the heat or combustion components. The battery module 800 can desirably prevent, by thermic isolation, the transmission of heat from one overheating battery cell to another battery cell of the battery module 800 or of another battery module, which may avoid a chain reaction of starting fires in the one or more other battery cells of the vehicle.

The battery module 800 can include a top housing 804, a top plate (also referred to as conductive plate) 862, multiple cell tubes (including cell tubes 812, 813, 814), multiple battery cells (including a battery cell 8120), multiple spacers (including spacers 863, 864, 865), a bottom plate 824 (also referred to as base plate), an additional module circuit board assembly 820, multiple sensors, multiple connectors (including a connector 825), and a bottom housing 826. Features of the corresponding components of the battery module 350 can also apply to the battery module 800, unless indicated otherwise.

The top housing 804 and the bottom housing 826 can be or include a plastic. The plastic can be flame retardant. The top housing 804 and the bottom housing 826 can be assembled together, for example by clipping or fastening to each other, and provide structural support for the other components of the battery module 800 and protect the other components of the battery module 800 from humidity or dust.

The top housing 804 and the bottom housing 826 or at least portions thereof can withstand the temperature of a fire of one of the multiple battery cells of the battery module 800 so that the fire from one does not burn through. Moreover, the top housing 804 and the bottom housing 826 can continue to provide structural support despite the fire of one of the multiple battery cells of the battery module 800.

The top housing 804 and the bottom housing 826 can together provide the battery module 800 an external shape of a rectangular prism or cube. The top housing 804 and the bottom housing 826 can have the same or similar structures such that the top housing 804 and the bottom housing 826 can be used in place of one another. The top housing 804 and the bottom housing 826 can together form a battery housing for the battery module 800.

The multiple cell tubes of the battery module 800 can include a total of nine cell tubes as illustrated. In other implementations, the battery module 800 may instead include a total of 2.N or 3.N cell tubes where N is an integer. The multiple cell tubes can be arranged in one or more rows (such as two, three, four, or more rows) and one or more columns (such as two, three, four, or more columns). At least some of each of the multiple cell tubes can have the same or similar structures so that the at least some of each of the multiple cell tubes may be used in place of one another.

The battery module 800 can include cooling plates (not shown) for distributing heat evenly between the cell tubes. The battery module 800 can include one or more thermal fuses (not shown). Individual of the thermal fuses can decouple one of the multiple cooling plates from one of the multiple cell tubes responsive to a thermal runaway, such as if a fire starts within or proximate to the one of the multiple cell tubes.

One battery cell, such as the battery cell 8120 (FIG. 6D), can be mounted into each of the battery cell tube, such as the cell tube 812. Each battery cell can be protected from mechanical shocks, heats, humidity, and other hazards by the cell tube in which it is mounted. The battery cell may be electrically isolated from the cell tube in which it is housed by a plastic film around the battery cell. A surface treatment can be applied to the inner surface and/or to the outer surface of each cell tube in order to make this surface electrically isolating and reduce the risk of short-circuit through the cell tube. The treatment can protect the cell tube, such as an aluminium cell tube, from corrosion.

Each battery cell, including the battery cell 8120, can be mounted to the top plate 862 with a top spacer, such as one of the top spacers 863, 864 or 865, accommodated in a corresponding hole, such as the hole 868, through the top plate 862. The top spacer supports the battery cell and the corresponding cell tube so that the top spacer, the corresponding hole through the top plate, the corresponding battery cell and the corresponding battery cell tube can all be positioned coaxially and fixed with respect to one other. The outer diameter of the battery cell is preferably smaller than the inner diameter of the cell tube, so that the battery cell is isolated from the walls of the cell tube with a plastic film.

The top spacers, such as the top spacers 863-865, are made of or comprises an electrically isolating, heat isolating and heat resistant material, to prevent heat from one overheating battery cell being transmitted through the top spacer to the top plate 862. The top spacer can be made of ceramic, glass-fiber or heat resistant plastic. The top spacer may comprise one part that is forced in the hole through the top plate 862, or two parts which can be screwed together. As can be seen in FIG. 6E that illustrates a cell tube, a battery cell and the top plate 862 without the top spacer, the cell tube and the battery cell may not be in direct contact with the top plate 862, and the top spacer can isolate these three components thermally and electrically from each other.

The top spacers can be shaped as a ring. Each top spacer can have an inner edge on a first side of the top spacer and an outer edge on a second side of the top spacer opposite the first side. The inner edge 8631 on the first side of the top spacer can circumferentially surround and support an outer diameter of part of the cell tube. The outer edge 8630 on the second side of the top spacer can be positioned in the hole of the top plate 862 to support the top plate 862.

Each battery cell, including the battery cell 8120, can be mounted to the bottom plate 824 with a bottom spacer, such as the bottom spacers 827 and 828, accommodated in a corresponding hole (not referenced) through the bottom plate 824. The bottom spacer supports the battery cell and the corresponding cell tube so that the bottom spacer, the corresponding hole through the bottom plate, the battery cell and the corresponding cell tube are all coaxially positioned and fixed with respect to each other. The bottom spacers are made or comprises a heat isolating and heat resistant material, to prevent heat from one overheating battery cell being transmitted through the bottom spacer to the cell tube or to the bottom plate 824. The bottom spacer can be made of ceramic or heat resistant plastic. The bottom spacers and the top spacers may be identical, so that the top spacers and the bottom spacers can be mutually interchangeable. The bottom spacer may comprise one part that is forced in the hole through the bottom plate, or two parts which can be screwed together.

The top spacer can be made of electric isolating material. The top spacer can provide an electric isolation between the negative pole of the battery cell 8120 on one side and the electronic components 822, the conductive layer 8620 or the PCB tracks in the conductive layer 8622 on the other side. If one wire bond 807 breaks or fuses, this electric isolation thus prevents electrical arcing between the battery cell 8120 and a conductive portion of the top plate 862. The outer edge 8630 of the top spacer can be thicker than the top plate 862 and form a rim 8632 that protrudes over the upper surface of the top plate 862 to increase the distance between the battery cell 8120 and the conductive portions 8622, 8620 of the top plate, thus reducing the risk of electrical arcing.

In a similar way, the bottom spacer can be made of electric isolating material. The bottom spacer can provide an electric isolation between the positive pole of the battery cell 8120 on one side and the bottom plate 824 on the other side and protrudes under the lower face of the bottom plate 824. If one wire bond 807 breaks or fuses, this electric isolation thus prevents electrical arcing between the battery cell 8120 and a conductive portion of the bottom plate 824.

This arrangement with heat-isolating spacers for supporting the battery cells and the cell tubes with the top and bottom plates can prevent or reduce the transmission of heat between an overheating battery cell and other battery cells of the same battery module through the top or bottom plate. Even if a cell tube becomes hot, for example if a battery cell within a cell tube burns or explodes, the top and bottom spacers can reduce the conductive transmission of heat from the cell tubes to other battery cells or cell tubes through the top and bottom plates 862 and 824 respectively.

The multiple battery cells, including the battery cell 8120, of the battery module 800 can store electrical energy. The electrical energy can be utilized for driving one or more motors, such as the motor 160. The one or more motors can propel a vehicle housing that is configured to fly. The multiple battery cells can be used to additionally or alternatively power other components supported by the vehicle housing.

One or more of the multiple battery cells can be Li-Ion or Li-Po battery cells. Individual of the multiple battery cells may be self-contained and be an off-the-shelf battery cell. The multiple battery cells can be substantially shaped as a cylinder. At least some of each of the multiple battery cells can have the same or similar structures so that the at least some of each of the multiple battery cells may be used in place of one another.

Figure 9:
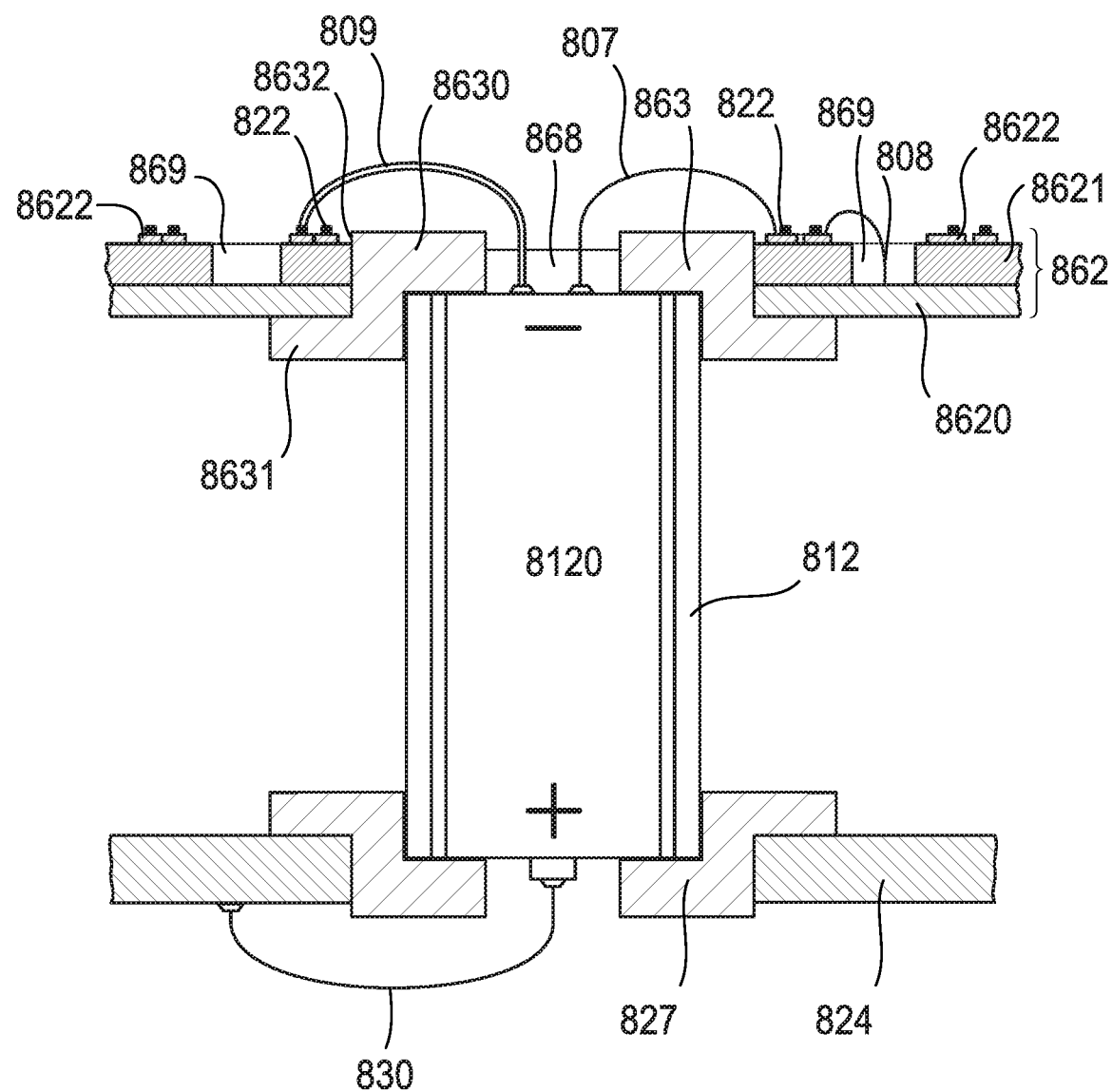
FIG. 9 illustrates an example of connection between a battery cell and a top conductive plate.

The multiple battery cells of the battery module 800 or subsets thereof can be electrically connected in series or parallel with one another to deliver a desired voltage and current. As illustrated in FIG. 9, for example, all of the multiple battery cells can be electrically connected in parallel with one another through the top plate 862 on one side and through the bottom plate 824 on the other side. As will be described, the top plate 862 and the bottom plate 824 each can comprise a relatively thick conductive layer, such as for example an aluminium layer 8620, for conducting the relatively high currents that are delivered by the plurality of battery cells in parallel.

Individual of the multiple battery cells of the battery module 800 can provide a current of 5 A, 10 A, 15 A, 20 A, 25 A, 30 A, 35 A, 40 A, 45 A, or 50 A or within a range defined by two of the foregoing values or another value greater or less than the foregoing values. Individual of the multiple battery cells can provide a voltage of 3.0 V, 3.2 V, 3.4 V, 3.5 V, 3.6 V, 3.8 V, 4.0 V, 4.2 V, 4.4 V, 4.5 V, 4.6 V, 4.8 V, or 5.0 V or within a range defined by two of the foregoing values or another value greater or less than the foregoing values. Individual of the multiple battery cells can provide an energy output of 5 Wh, 10 Wh, 15 Wh, 20 Wh, 25 Wh, 30 Wh, 35 Wh, 40 Wh, 45 Wh, 50 Wh, 55 Wh, 60 Wh, 65 Wh, 70 Wh, 75 Wh, 80 Wh, 85 Wh, 90 Wh, 95 Wh, or 100 Wh or within a range defined by two of the foregoing values or another value greater or less than the foregoing values. Individual of the multiple battery cells of the battery module 800 can have a height of 40 mm, 45 mm, 50 mm, 55 mm, 60 mm, 65 mm, 70 mm, 75 mm, or 80 mm or within a range defined by two of the foregoing values or another value greater or less than the foregoing values. Individual of the multiple battery cells of the battery module 800 can have a diameter of 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm or within a range defined by two of the foregoing values or another value greater or less than the foregoing values.

Individual of the multiple battery cells of the battery module 800 can be positioned within individual of the multiple cell tubes, as well as removed from individual of the multiple cell tubes. The fit of the individual of the multiple battery cells of the battery module 800 within the individual of the multiple cell tubes can, for instance, be a loose fit or a light interference fit. The multiple battery cells can be arranged in the multiple cell tubes so that negative terminals, such as a negative terminal 815, may be directed toward the top housing 804 rather than the bottom housing 826. Alternatively, one or more of the multiple battery cells can be arranged in the multiple cell tubes so that positive terminals may be directed toward the top housing 804 rather than the bottom housing 826.

The top plate 862 can be used to electrically connect two or more terminals of the multiple battery cells of the battery module 800. For example, where the multiple battery cells can be arranged in the multiple cell tubes so that negative terminals are directed toward the top housing 804, the top plate 862 can electrically connect the negative terminals to one another, such as via top wire bonding 807 through the hole 868, as shown in FIGS. 6C, 6F and 9 (such as aluminum wire bonding) or instead via spot welding. If the top plate 862 may be connected via the top wire bonding 807, the top wire bonding 807 can function as a fuse and decouple its mechanical, electrical and thermal connection responsive to a high temperature condition or a high electrical current condition.

The top plate 862 may comprise a plurality of subplates, for example, two, three, four, five, six, or any number of sub plates.

The top plate 862 may be conductive and electrically connected to a top plate or bottom plate of another battery module (not shown). The multiple battery cells of the battery module 800 can be electrically in series or parallel with the multiple battery cells of the another battery module. In one example, the multiple battery cells of the battery module 800 can be electrically connected in series with the multiple battery cells of the another battery module so that a combined voltage output from the battery module 800 and the another battery module may provide a desired voltage level.

The bottom plate 824 can be conductive and used to electrically connect two or more terminals of the multiple battery cells of the battery module 800. For example, where the multiple battery cells can be arranged in the multiple cell tubes so that positive terminals are directed toward the bottom housing 826, the bottom plate 824 can electrically connect positive terminals of the multiple battery cells to one another, such as via bottom wire bonding 830 shown in FIGS. 6B and 9 (such as aluminium wire bonding) or instead via spot welding. If the bottom plate 824 may be connected via the bottom wire bonding 830, the bottom wire bonding 830 can function as a fuse and decouple its mechanical, electrical and thermal connection responsive to a high temperature condition or a high electrical current condition.

The bottom plate 824 may comprise a plurality of subplates, for example, two, three, four, five, six, or any number of sub plates.

Figure 7:
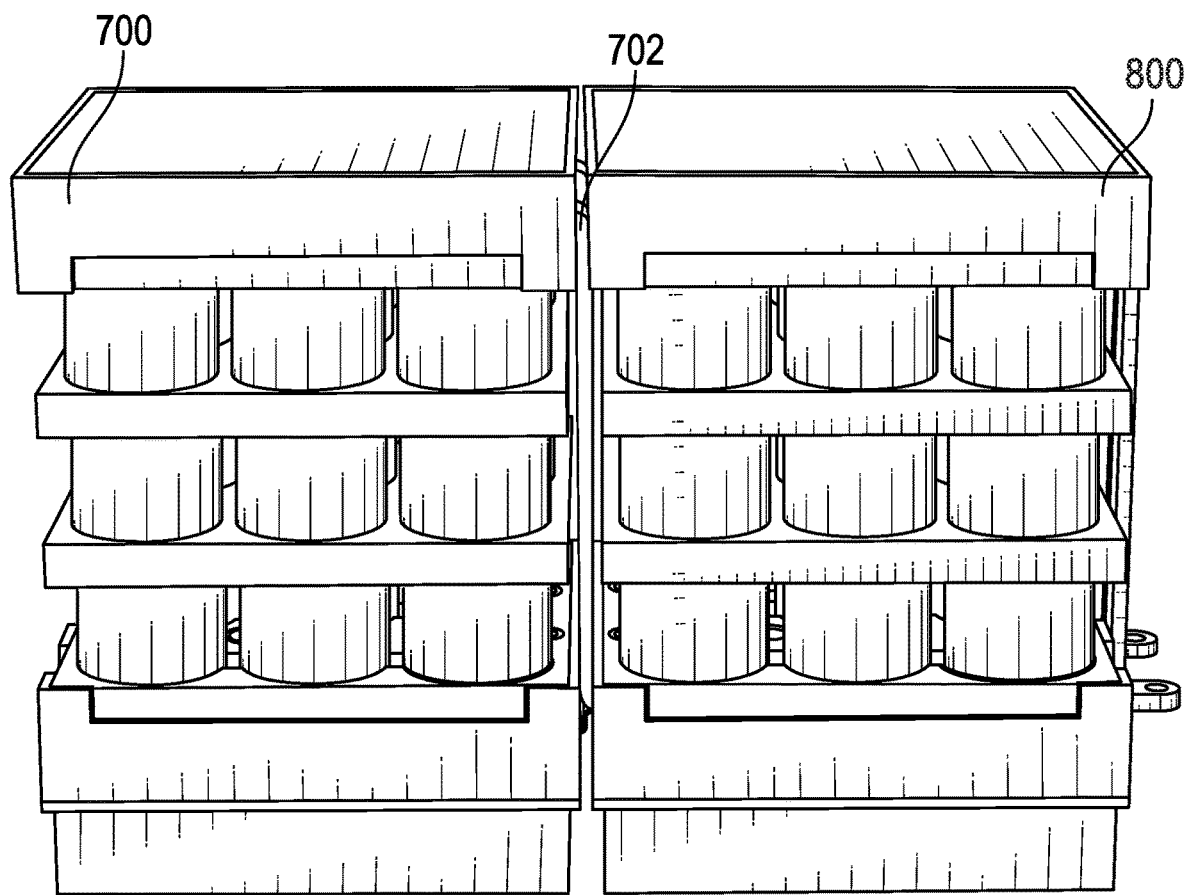
FIG. 7 illustrates example connected battery modules usable in a vehicle, such as the aircraft of FIG. 1A.

The bottom plates of one battery module, such as the battery module 800, can, as shown in FIG. 7, mechanically (for example, via one or more fasteners or an adhesive) and electrically connect to another top plate, such as another top plate 702, of at least one different battery module, such as the battery module 700. The mechanical connections can fix the battery module 800 to the different battery module 700 within a same battery pack. The multiple battery cells of the battery module 800 can be electrically connected in series or parallel with the multiple battery cells of the different battery module 700 in a battery pack. Where the structure of the different battery modules 700 may be the same or similar to the structure of the battery module 800, the different battery module 700 and the battery module 800 can, for instance, be connected in series with one another. The different battery module 700 and the battery module 800 can be electrically connected in series with the multiple battery cells of the another battery module so that a combined voltage output from the battery module 800 and the another battery module may provide a desired voltage level.

Although FIG. 7 illustrates two battery modules 700, 800 mechanically and electrically connected, one or more additional battery modules can be similarly mechanically and electrically connected. For example, three, four, five, six, seven, eight, nine, ten, or more battery modules can be similarly mechanically and electrically connected to together in a row to form a battery pack as power source having a greater performance capability (such as a greater voltage, current, or power output) than an individual one of the battery modules or a subset of the battery modules.

The top plate and the bottom plate of the battery module 800 can be or include aluminum, copper, or another conductive material. Although the top and bottom plates of the battery module 800 are shown as plates, the plates may each instead be one or more bars in other implementations.

FIG. 9 illustrates an example of mounting of the battery cell 8120 and the cell tube 812 between the top plate 862 and the bottom plate 824. The battery cell 8120 and the cell tube 812 are fixed or glued with top spacers 863 and bottom spacers 827 to the top plate 862 and to the bottom plate 824 respectively.

The top plate 862 comprises a printed circuit board (PCB) with a aluminium layer 8620 (which may be relatively thick), an isolating layer 8621, such as an epoxy layer, and a conductive layer 8622, such as a copper layer, (which may be relatively thin, such as thinner than the aluminium layer 8620). The aluminium layer 8620 is used as conductive plate for connecting the different battery cells of the battery module 800. Using aluminium can reduce the weight of the top plate 862; alternatively, other conductive materials, including copper, could be used in place of or in addition to aluminium. Since the layer 8620 is relatively thick, it can withstand the addition of currents from the plurality of battery cells in the battery module.

The conductive layer 8622 can be made up of a plurality of PCB tracks and PCB pads for mounting and connecting multiple electronic components 809, 822, such as one or more sensors 809, one or more switches (such as relays, MOSFETs, IGBTs) and/or one or more controllers. Each track of the conductive layer may, in certain implementations, be constructed to withstand the current from no more than one battery cell, or a portion of the current from one battery cell, so each track can be made relatively thin and light.

The one or more sensors 809 can be used for monitoring a voltage, a current, a temperature, or an internal pressure of each or the plurality of battery cells. The one or more sensors can be mounted on a PCB track of the conductive layer 8622, or, as the temperature sensor 809, between such a PCB track and the battery cell 8120. One or more sensors can be located remotely from the PCB tracks and connected to the PCB tracks to monitor parameters outside of the PCB track, such as the battery cell surface temperature.

The one or more switches can be used for selectively disconnecting each single battery cell, for example in case of over-temperature, over-current, over-voltage, over-pressure and/or other malfunctions of the battery cell.

The one or more controllers may be used for controlling the transfer of energy from or to the multiple battery cells of the battery module 800 or may monitor one or more parameters of the multiple battery cells. The one or more controllers can be in electrical communication with the multiple sensors to permit the one or more controllers to monitor at least some of the one or more parameters with the multiple sensors.

The aluminium layer 8620 can face the bottom plate 824 while the conductive layer, tracks 8622 may face the top direction of the battery module 800, toward the top housing 804. The conductive layer 8622 and the epoxy layer 8621 may be milled in order to create blind holes 869 for electrically connecting via wire-bonding the conductive layer 8620 with the battery cell 8120, the electronic components 822 and/or one track of the conductive layer 8622.

The current from one pole of the battery cell 8120 can flow directly to the conductive track 8620, for example through direct wire-bonding between the battery cell and the conductive track 8620. A pole of the battery cell can be connected through one wire bond 807 to one PCB track of the conductive layer 8622, and the current can flow through this PCB track to one or a plurality of electronic components 809, 822 such as sensors and/or switches, and then, via another PCB track of the conductive track 8622 and another wire-bond 808 that goes through a blind hole 869, to the thick conductive layer 8620 where the current will be added to the currents from one or more other battery cells. The sensor can be used for measuring a current or other parameters of the battery cell. The switch can be used for disconnecting the battery cell from the aluminium layer 8620 when a disfunction of the battery cell 8120 is detected by one sensor.

The multiple sensors can include one or more sensors, such as the sensor 822 or the temperature sensor 809. Sensors may physically pass through sensor holes (not shown) through the top plate 862 to permit the one or more sensors to detect one or more temperatures proximate to or on one or more of the multiple cell tubes or multiple cooling plates of the battery module 800.

The wire-bonds, such as wire bonds 807 and 808, can be used as fuses for disconnecting a battery cell when the temperature of one wire-bonds becomes sufficiently hot that the wire-bond melts. The melting of one of the wire-bonds may prevent greater than a set amount of current from passing, such as greater than a multiple (for instance, 1, 2, 3, 4, 5, 10, or 20 times) of a maximum operating current for the battery cell.

The one or more controllers can control operations of the battery module 800 and transfer of energy from or to the multiple battery cells at least according to sensor data generated by the multiple sensors. For example, the one or more controllers can shut down power generation by the battery module 800 or trigger an alarm responsive to a detected high temperature condition by one of the multiple sensors.

In another embodiment (not shown), the isolating layer 8621 of the top plate 862 can be a thin isolating layer that may not be rigid, and the upper copper layer 8622 can be replaced with a flexible printed circuit board (Flex PCB) fixed or glued to that isolating layer. The electric connection between the battery cell and the flex PCB's tracks or electronic components 822 can be done by wire bonding and the electric connection from the Flex PCB to the aluminium layer 8260 can be performed via through-holes through the Flex-PCB and holes through the isolating layer 8621 or wire bonding between the flex PCB's tracks and the aluminium layer.

An additional module circuit board 820 (FIGS. 6A and 6C) can be positioned on a lateral side of the battery module 800 so that the additional module circuit board 820 is out of the path of a fire from one or more of the multiple battery cells and does not obstruct the exhaust of heat or fumes from any overheating battery cell. The additional module circuit board 820 can be fixed to the top housing 804 and/or to the bottom housing 826. Some of the sensors 622 and one or more controllers can be mounted onto the additional module circuit board 820 instead of the top plate 862. The top plate 862 and the additional module circuit board 820 can be electrically connected to each other through one or more cables and connectors.

The multiple connectors, including the connector 825, of the battery module 800 can be mechanically and electrically connected to the additional module circuit board 820. The multiple connectors can be used by the one or more controllers of the additional module circuit board 820 to receive data from the components on the top plate 862 and/or from outside the battery module 800 or transmit data to the components on the top plate 862 and/or outside the battery module 800.

The one or more controllers can receive commands via one or more of the multiple connectors. The commands can, for instance, be used by the one or more controllers to set an operating mode for the battery module 800 or configuration settings (such as an operating power level or permissible operating temperature limit) for the battery module 800. The one or more controllers can, for instance, transmit operating status or logs, sensor data detected by the multiple sensors, or alarms via one or more of the multiple connectors.

The multiple connectors can include a total of four connectors as illustrated. In other implementations, the battery module 800 may instead include one, two, three, five, six, or more connectors. Where the multiple connectors of the battery module 800 may include a total of two connectors as illustrated, one of the multiple connectors can be input connector for receiving data and the other of the multiple connectors can be input connector for transmitting data. Alternatively, both of the multiple connectors can function to input and output data and may, for example, communicate via separate communication channels, such as with redundant controllers. At least some of each of the multiple connectors can have the same or similar structures so that the at least some of each of the multiple connectors may be used in place of one another. One or more of the multiple connectors may be a serial bus connector. Although the multiple connectors are illustrated as female connectors in FIG. 6B, the multiple connectors can be male or female connectors.

Figure 6B:
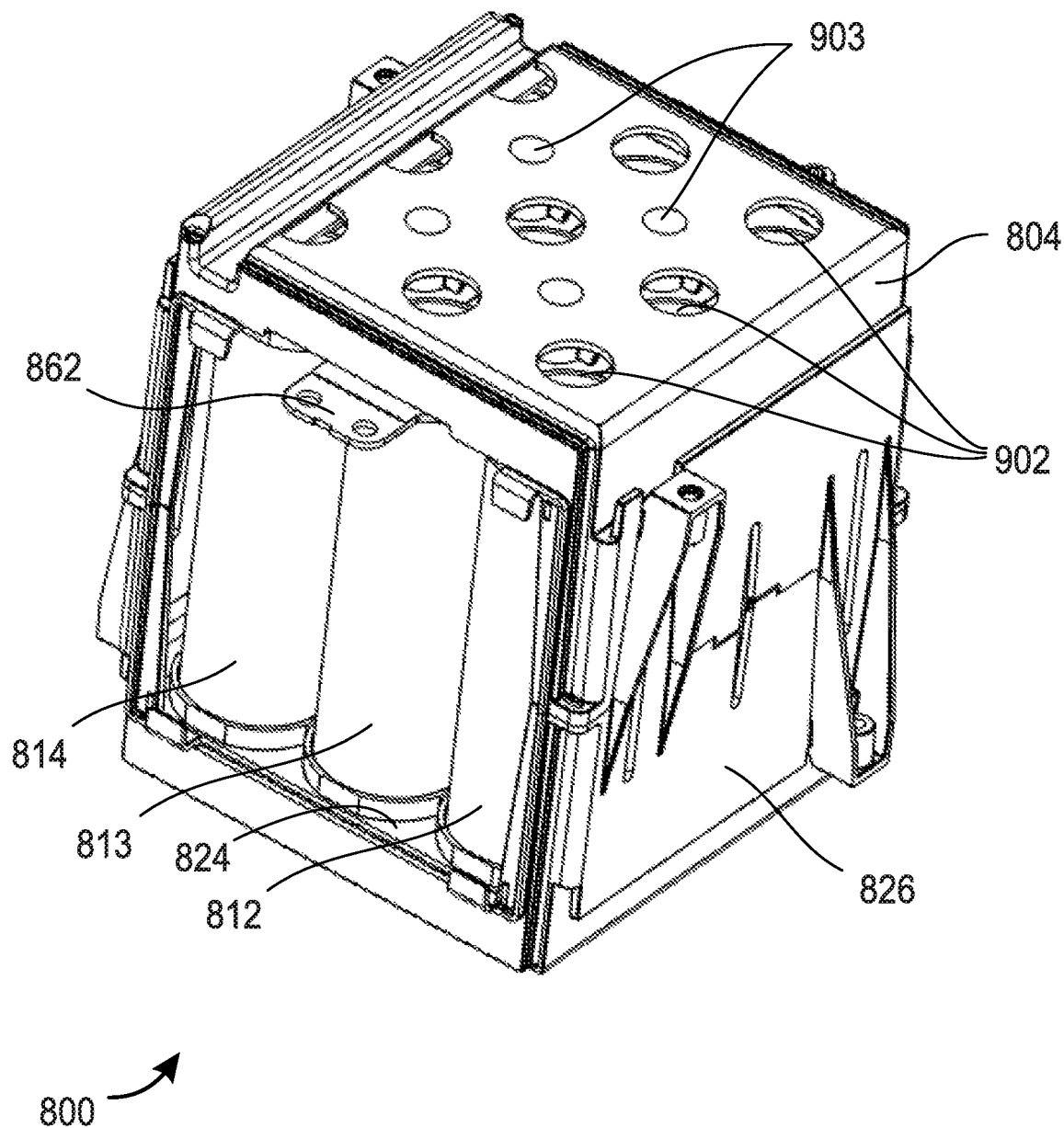
Figure 6C:
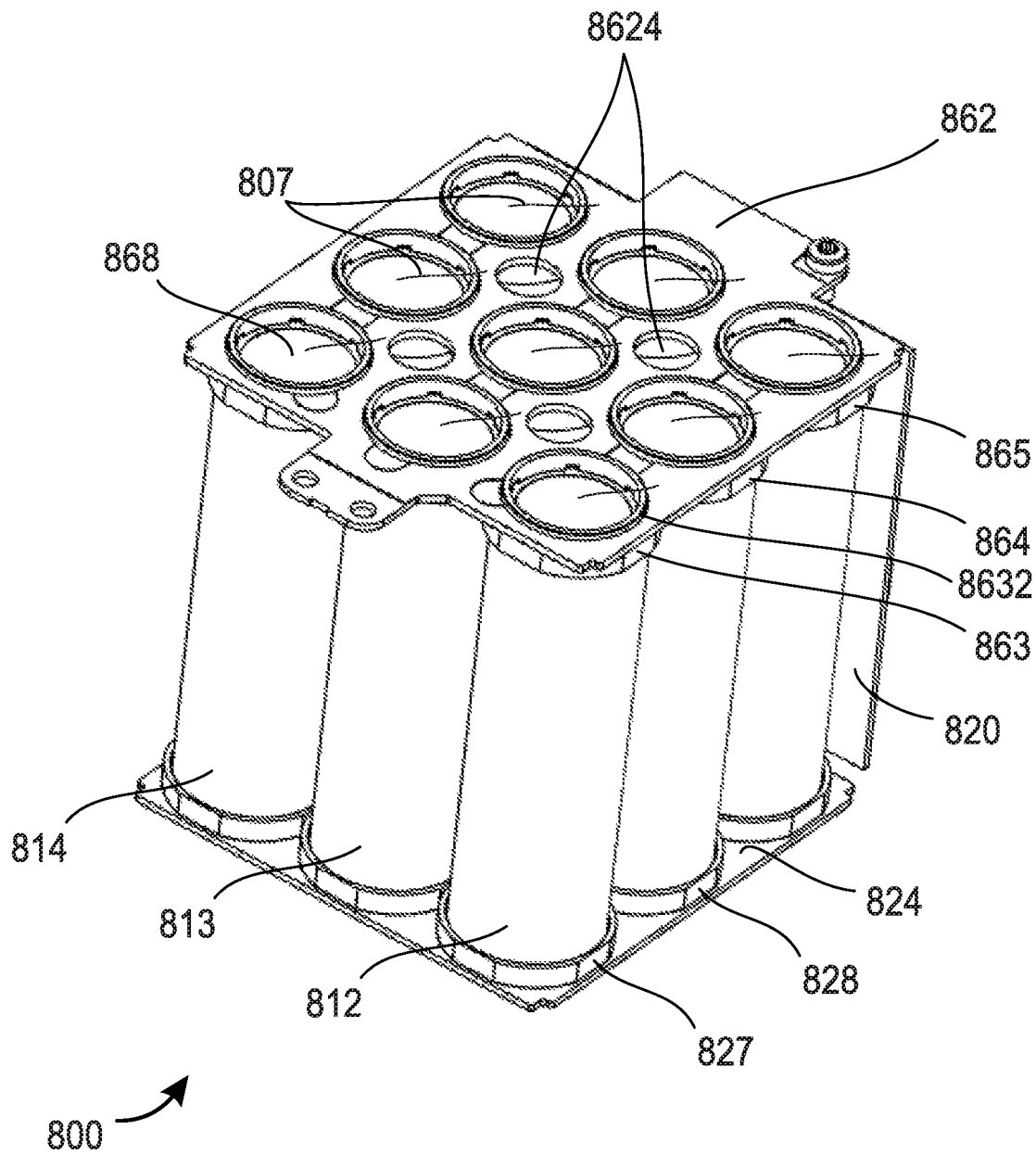
Figure 6D:
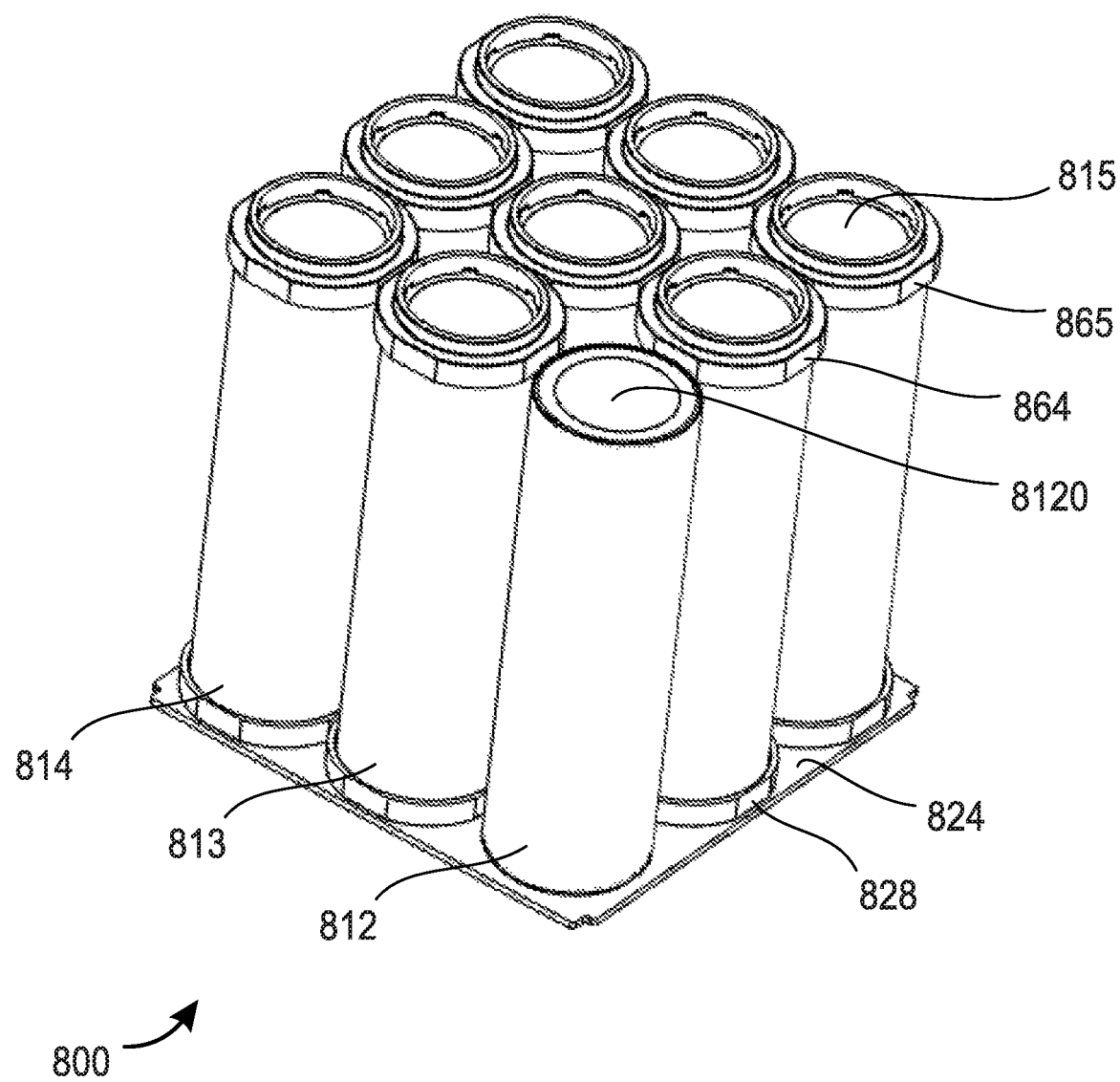
Figure 6E:
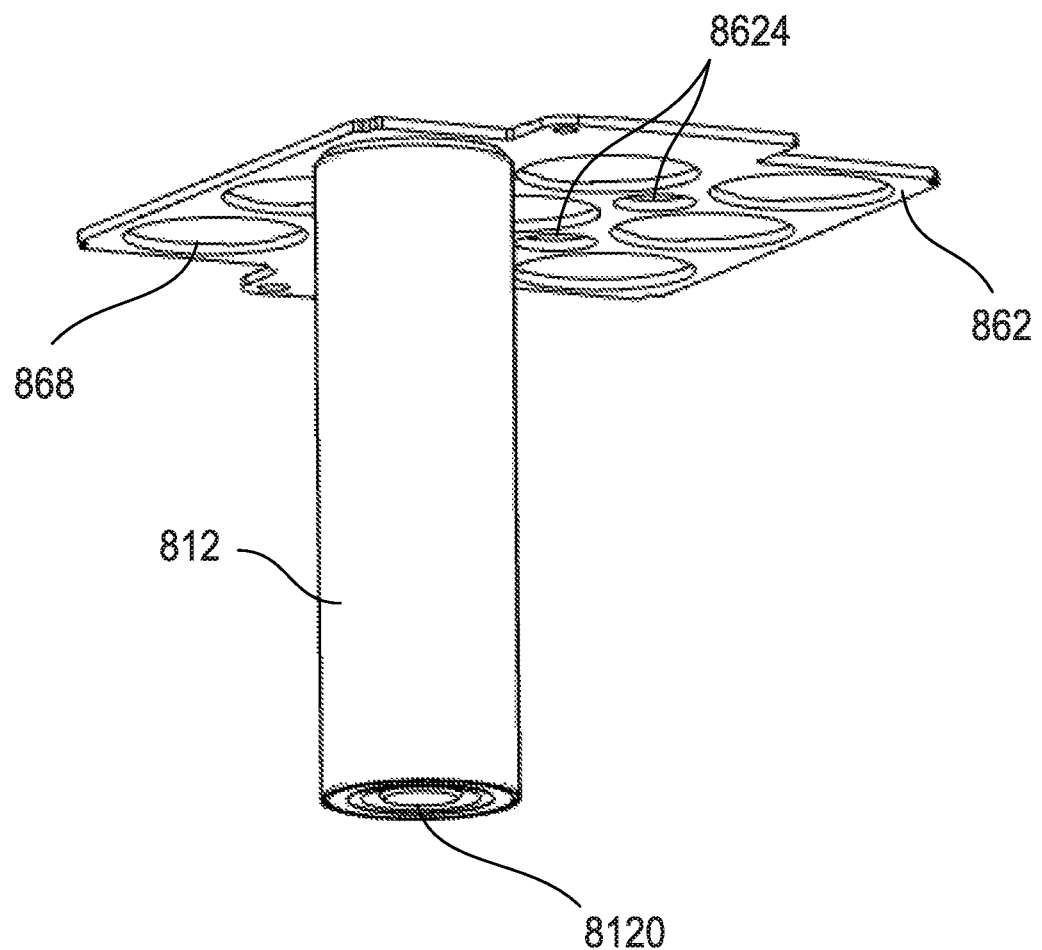
Figure 6F:
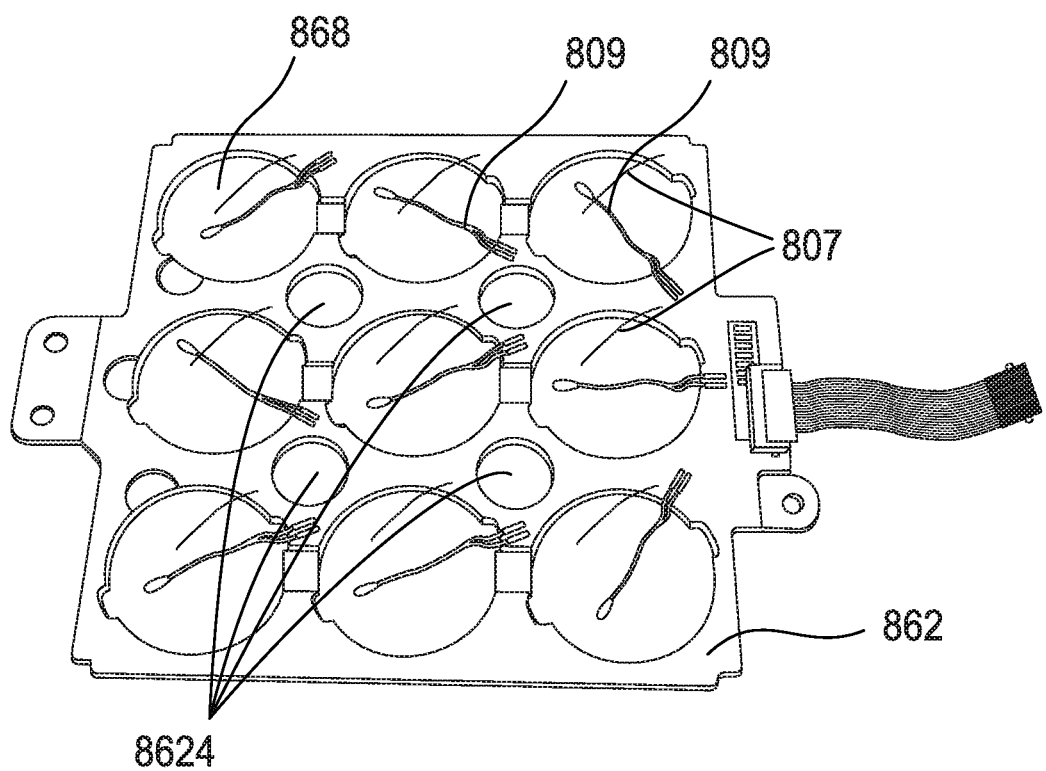
Figure 6G:
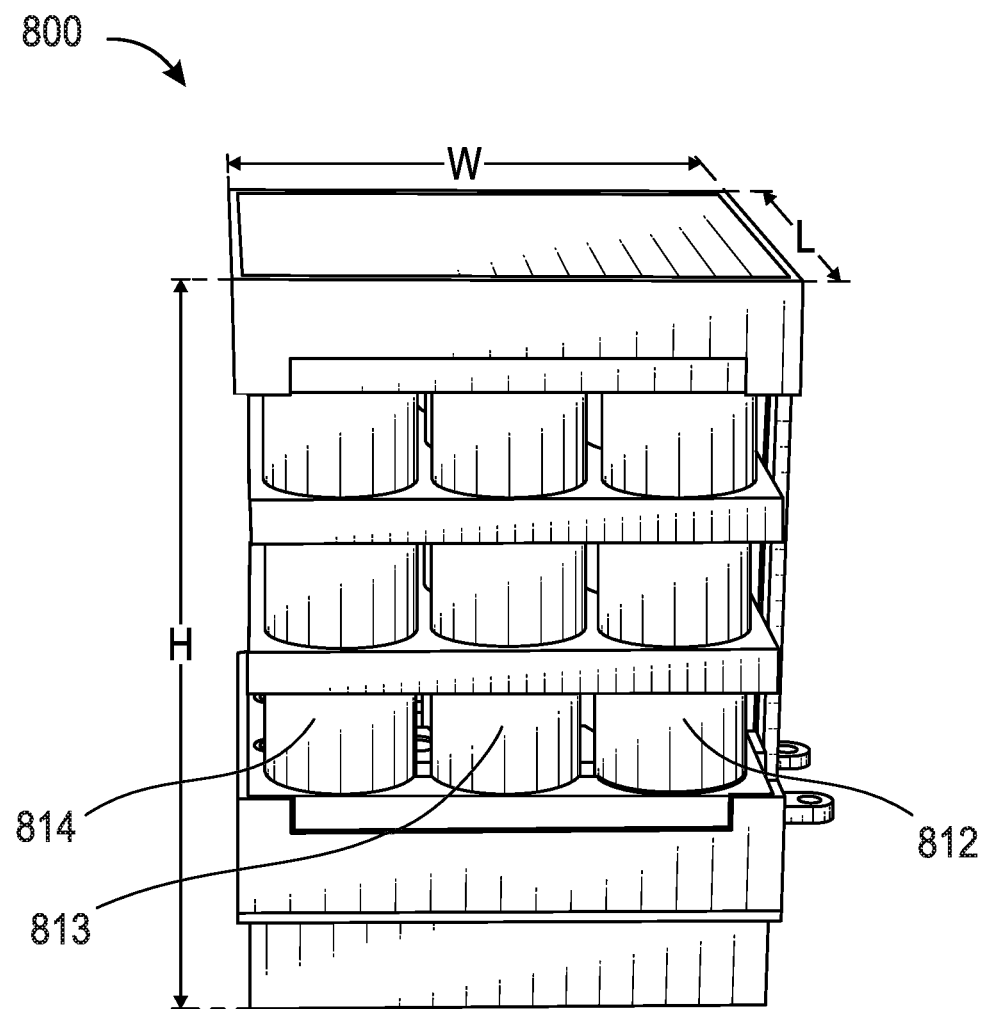

The battery module 800 can have a length of L, a width of W, and a height of H as shown in FIG. 6G. The length of L, the width of W, or the height of H can each be 50 mm, 65 mm, 80 mm, 100 mm, 120 mm, 150 mm, 200 mm, 250 mm, 300 mm, 350 mm, 400 mm, 450 mm, or 500 mm or within a range defined by two of the foregoing values or another value greater or less than the foregoing values. For example, L can be around 80 mm, W can be around 80 mm, and H can be around 100 mm.

The battery module 800 may include fewer or additional components in some implementations. For example, the battery module 800 can include a heat absorber material (not shown), such as a phase change material, a gel, or the like, between the top housing 804 and the battery cells to absorb heat and energy upon the one or more of the multiple battery cells of the battery module 800 catching fire and which may help the fire from reaching the other of the multiple battery cells.

The battery module 800 can be constructed and positioned, such as in a vehicle, so that air may flow by the battery module 800 in a direction from the bottom housing 826 to the top housing 804 or may circulate from one side of the battery module 800 to another side. The air flowing by the battery module 800 can flow through the top plate 862 through holes 8624 and through corresponding holes (not shown) through the bottom plate 824. The holes 8624 through the top plate 862 and the corresponding holes through the bottom plate 824 direct the air to flow between the cell tubes, such as the cell tubes 812, 813, 814 and other cell tubes, but may not flow within the cell tubes to prevent humidity, dust, heat or fumes from reaching the battery cells, such as the battery cell 8120, within the cell tubes.

The air flowing by the battery module 800, such as from an inlet channel as described herein, can cool the multiple battery cells of the battery module 800, as well as be used to expel any combustion products, fumes, smoke, heat, or steam from the battery module 800. After the air passes by the battery module 800, the air may be transferred to an exhaust, such as an exhaust channel as described herein. Such construction and positioning of the battery module 800 may advantageously permit cooling of the multiple battery cells and expelling of any combustion products, fumes, smoke, heat, or steam with a single combined system rather than utilizing two different systems that may add additional weight.

The full wing structure of an aircraft may be vented so that an inner volume of the wing can act as an exhaust channel. In that case, no additional structure may be added to create the exhaust channel.

As illustrated in FIGS. 6A and 6B, the top housing 804 can be provided with holes 902 or valves, each hole or valve being coaxial with one battery cell, one cell tube, one top spacer and one bottom spacer, so that heat and fumes from one overheating battery cell will pass through one of the battery spacer, through one of the holes through the top plate 862, through the corresponding hole 902 or valve and out of the top housing 804.

The holes 902 through the top housing 804 may be covered with a tape or a cover (not shown) that closes the hole during normal operation, and prevent humidity and dust from entering the battery cell terminal region or the volume between the top plate respectively bottom plate and the housing.

The top housing 804 can be provided with holes 903 for circulating air between the cell tubes. The holes 903 can be connected with the holes 8624 through the top plate 862, for example through a tube (not shown) which may be integral with the top housing. The tape or cover may not cover the holes 903 thus allowing air to circulate between the cell tubes and cool the cell tubes and the battery cells within the cell tubes.

In a similar way, holes (not shown) through the bottom housing 826 that may be disposed coaxially with a corresponding cell tube may be covered with a tape or a cover (not shown) that closes the hole during normal operation, and prevent humidity and dust from entering the battery cell terminal region. The tape or cover does not cover the holes through the bottom housing thus allowing air to circulate between the cell tubes and to cool the cell tubes and the battery cells within the cell tubes.

If one of the multiple battery cells of the battery module 800 catches fire, the tape or cover on the top housing 804 or bottom housing 826 can be moved by a pressure difference between (i) a pressure in housing of the one of the multiple battery cells that caught fire and (ii) a pressure on a side of the tape opposite of the one of the multiple battery cells that caught fire. The pressure difference may entirely separate the tape or cover from the battery module 800, or tear the tape or cover to create an opening through the tape or cover for releasing the pressure within the housing.

Figure 8:
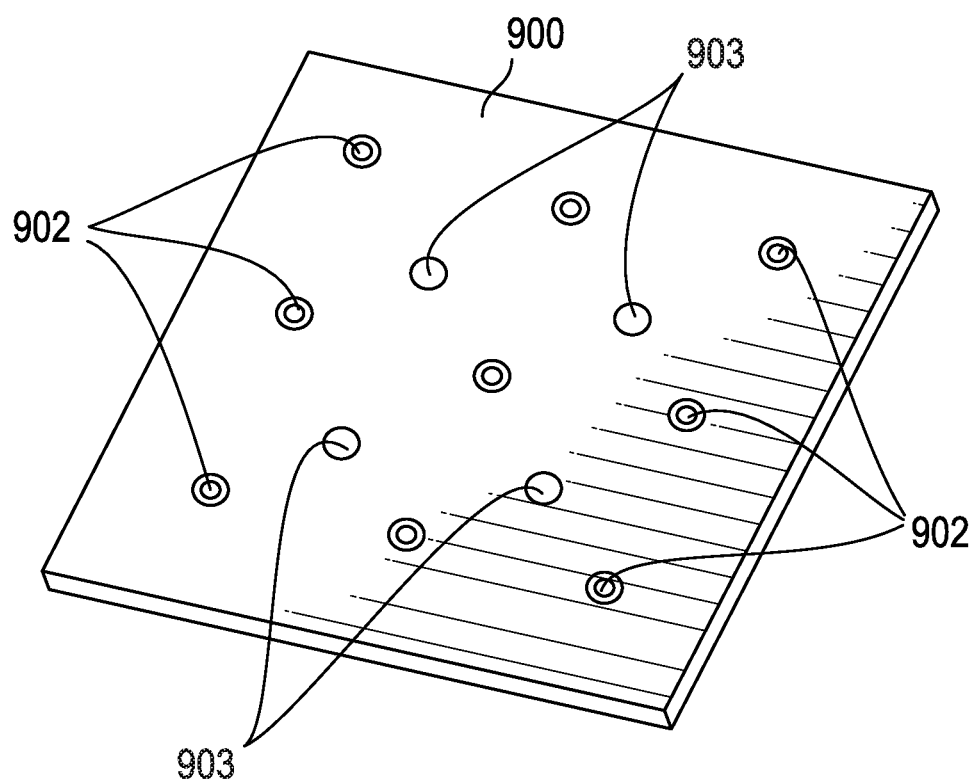
FIG. 8 illustrates an example top cover with holes usable with a battery module.

FIG. 8 illustrates a top cover 900 with cover holes, such as a cover hole 902, usable with a battery module, such as the battery module 800. The top cover 900 can be used in place or as part of the top housing 804 and/or bottom housing 826. The cover holes can permit combustion products, fumes, smoke, heat, or steam to escape from one or more of the multiple battery cells of the battery module 800 that catch fire without permitting the combustion products, fumes, smoke, heat, or steam to enter another of the multiple battery cells. The cover holes may permit a certain amount or rate of combustion products, fumes, smoke, heat, or steam to escape and a certain amount of energy absorption by the top cover 900 prior to the top cover 900 being moved by a pressure difference between (i) a pressure in the one or more cell tubes of the one or more of the multiple battery cells that catch fire and (ii) a pressure on a side of the top cover 900 opposite the one or more cell tubes of the one or more of the multiple battery cells that catch fire.

Example Implementations

A battery module is disclosed comprising: a plurality of battery cells supported to conductive plate with heat-isolating spacers. The spacers provide thermal isolation between the battery cell and the conductive plate.

The battery module can comprise a plurality of cell tubes configured to accommodate the plurality of battery cells within the plurality of cell tubes so that individual of the plurality of battery cells are positioned within individual of the plurality of cell tubes, each battery cell having a first electric pole and a second electric pole.

The battery module can comprise a first conductive plate which mutually electrically connects the first poles of each of the plurality of battery cells, said first conductive plate comprising a plurality of first holes so that individual of the plurality of cell tubes are facing individual of the plurality of first holes.

The battery module can comprise a second conductive plate which mutually electrically connects the second poles of each of the plurality of battery cells, said second conductive plate comprising a plurality of first holes so that individual of the plurality of cell tubes are facing individual of the plurality of first holes.

Each spacer is supported in one of said first holes and configured to support one end of a cell tube and one end of the battery cell in the cell tube.

The spacer provides thermal and electrical isolation between the battery cell and the top plate or bottom plate.

The battery module can power a motor that propels a vehicle housing.

The battery module can include a battery housing configured to support a plurality of battery cells and a conductive plate which electrically connects the plurality of battery cells. The vehicle housing can support the battery module and the motor.

An exhaust channel can be coupled to the battery module and configured to divert a fire from one of the plurality of battery cells toward an exhaust port of the vehicle housing to prevent the fire from spreading to another of the plurality of battery cells.

The battery module of the preceding paragraphs can include one or more of the following features: The battery module can include an inlet channel coupled to the power source and configured to direct an air flow through the battery housing and into the exhaust channel. The battery housing can orient the plurality of battery cells in a common direction with cathodes of the plurality of battery cells being on a common side of the battery housing. The battery housing can support a conductive plate, and the conductive plate can electrically connect the plurality of battery cells. The conductive plate can electrically connect the plurality of battery cells in parallel with one another. The conductive plate can include copper or aluminum. The conductive plate can include a hole or a weakened portion that is configured to permit the fire to pass into the exhaust channel. The battery module can include an insulation between the power source and the exhaust channel, and the insulation can prevent the fire from spreading to another of the plurality of battery cells. The insulation can include a fire retardant. The vehicle housing can support the battery module so that an air flow passes through the battery housing toward the exhaust channel when the vehicle housing is in motion. The vehicle housing can fly. A total number of battery cells included in the battery module can be between 4 battery cells and 32 battery cells, inclusive. Each of at least some of the plurality of battery cells can be substantially shaped as a cylinder. The battery housing can be substantially shaped as a rectangular prism. The battery housing can include flame retardant material. The battery housing can include plastic. The battery module include one or more sensors configured to monitor a voltage or a temperature of the plurality of battery cells, and the one or more sensors may not be positioned between the battery housing and the exhaust channel.

The exhaust channel can divert another fire from one of the additional battery cells to the exhaust port to prevent the another fire from spreading to another of the plurality of battery cells or the additional battery cells.

The battery module of the preceding paragraphs can include one or more of the following features: A plurality of cell tubes can support the plurality of battery cells within the plurality of cell tubes so that individual of the plurality of battery cells are positioned within individual of the plurality of cell tubes, the plurality of cell tubes being supported by the battery housing with one first end of each cell tube being directed toward the exhaust channel, the plurality of battery cells each being self-contained, the plurality of battery cells being removable from the plurality of cell tubes. An inlet channel arranged to direct an air flow through the battery housing and into the exhaust channel, a second end of each of the plurality of cell tubes being directed toward the inlet channel. A cover can be supported by the battery housing. The cover can include a material that absorbs heat from a first fire in one of the plurality of battery cells. A sensor can monitor a temperature of one of the plurality of cell tubes or one of the plurality of cooling plates. The battery housing, the plurality of cell tubes, and the plurality of cooling plates are configured to evenly distribute heat so that the plurality of battery cells age at a common rate. An isolation can be positioned between (i) the conductive plate and (ii) the plurality of cell tubes, the isolation providing electrical or thermal insulation. The conductive plate can electrically connect the plurality of battery cells in parallel with one another. The plurality of cell tubes can include aluminum, steel, or carbon. The plurality of cell tubes can be arranged in at least two rows of cell tubes and at least two columns of cell tubes. A circuit board assembly can be supported by the battery housing and include a controller, the controller being configured to monitor one or more parameters of the plurality of battery cells or control an energy transfer from the plurality of battery cells to the motor. The battery housing can mechanically couple to additional battery housings on opposite sides of the battery housing, the battery housing and the additional battery housings each having a common structure, the plurality of battery cells being configured to electrically couple in series or parallel with additional battery cells of the additional battery housings to together power the motor. The additional battery housings can support the additional battery cells within additional cell tubes, the additional cell tubes and the plurality of cell tubes being configured to direct any combustion components from any fires from the additional battery cells and the plurality of battery cells in the common direction. A circuit board assembly can be provided and include a sensor (622) configured to monitor a voltage, a current, or an internal pressure of at least one of the plurality of battery cells (614), and a controller can be mounted on the circuit board assembly and control an energy transfer from the plurality of battery cells responsive to the voltage, the current, or the internal pressure. The controller can communicate, via a connector, with an electronic device separate from the battery housing. A total number of battery cells included in the plurality of battery cells is between 4 battery cells and 32 battery cells, inclusive. The vehicle housing can fly and support the battery housing so that an air flow passes through the battery housing toward the exhaust channel when the vehicle housing is in motion.

A battery module can include: a plurality of cell tubes configured to accommodate a plurality of battery cells within the plurality of cell tubes so that individual of the plurality of battery cells are positioned within individual of the plurality of cell tubes; a first conductive plate comprising a plurality of first holes and configured to electrically connect first terminals of the plurality of battery cells; and a plurality of first spacers mounted in the plurality of first holes and configured to support the plurality of cell tubes and the plurality of battery cells with respect to the first conductive plate, the plurality of first spacers being configured to provide thermal and electrical isolation between the plurality of battery cells and the first conductive plate.

The battery module of the preceding paragraph include one or more of the following features: A second conductive plate comprising a plurality of second holes and configured to electrically connect second terminals of the plurality of battery cells opposite the first terminals, and a plurality of second spacers mounted in the plurality of second holes and configured to support the plurality of cell tubes and the plurality of battery cells with respect to the second conductive plate, the plurality of second spacers being configured to provide thermal and electrical isolation between the plurality of battery cells and the second conductive plate. The plurality of first spacers comprise ceramic, plastic, or glass fiber. The plurality of first spacers are configured to support the plurality of battery cells and the plurality of cell tubes so that the plurality of battery cells, the plurality of cell tubes, and the first conductive plate do not directly contact each other, the plurality of battery cells being removable from the plurality of cell tubes. One or more of the plurality of first spacers is ring-shaped and comprises a first side and a second side opposite the first side, and the first side has an inner edge and the second side has an outer edge, the inner edge circumferentially surrounding and supporting part of one of the plurality of cell tubes, the outer edge being positioned in one of the plurality of first holes to support the first conductive plate. The plurality of first holes are configured to permit combustion components from the plurality of battery cells to pass through the first conductive plate. A housing configured to support the first conductive plate, the housing comprising a plurality of second holes facing the plurality of first holes, the plurality of second holes being configured to permit the combustion components to pass through the housing. Tape or a cover that is attached to the housing and covering the plurality of second holes, the tape or the cover being configured to release from the housing responsive to a pressure within one of the plurality of cell tubes increasing from an explosion of one of the plurality of battery cells. The plurality of second holes is configured to direct an air flow through the housing between plurality of cell tubes but not within the plurality of cell tubes. The plurality of cell tubes comprises a surface treatment that is electrically isolating. The first conductive plate comprises a printed circuit board, the printed circuit board comprising a sensor configured to monitor a voltage, a current, a temperature, or an internal pressure of at least one of the plurality of battery cells. A circuit board assembly electrically connected to the printed circuit board, and a controller mounted on the circuit board assembly and configured to control the plurality of battery cells. The plurality of cell tubes are configured to accommodate a total of between 4 battery cells and 32 battery cells, inclusive. The plurality of first spacers being configured to support the plurality of cell tubes to divert a fire from one of the plurality of battery cells toward an exhaust channel to prevent the fire from spreading to another of the plurality of battery cells. An inlet channel configured to direct an air flow to and around the plurality of cell tubes and into the exhaust channel. The plurality of cell tubes comprises aluminum, steel, or carbon. The plurality of cell tubes are arranged in at least two rows of cell tubes and at least two columns of cell tubes. A vehicle housing supporting the battery module of claim 1 so that an air flow passes by the plurality of cell tubes when the vehicle housing is in motion, the vehicle housing being configured to fly.

A battery module can include: a plurality of cell tubes configured to accommodate a plurality of battery cells within the plurality of cell tubes so that individual of the plurality of battery cells are positioned within individual of the plurality of cell tubes; and a conductive plate comprising a printed circuit board, the printed circuit board comprising a first conductive layer and an isolating layer, the isolating layer comprising a blind hole through which a wire bonding extends, the wire bonding being electrically connected to the first conductive layer.

The battery module of the preceding paragraph include one or more of the following features: The first conductive layer is configured to pass a current from all of the plurality of battery cells. The conductive plate comprises a second conductive layer, the second conductive layer comprising a plurality of printed circuit board tracks and an electronic component mounted on the plurality of printed circuit board tracks, the second conductive layer being thinner than the first conductive layer. The wire bonding is configured to electrically connect the plurality of printed circuit board tracks to the first conductive layer or the plurality of battery cells. The wire bonding is configured to electrically connect the plurality of battery cells to the first conductive layer. The wire bonding comprises aluminum. The electrical component comprises a sensor configured to monitor a voltage, a current, a temperature, or an internal pressure of at least one of the plurality of battery cells. The electrical component comprises a switch configured to electrically connect and disconnect one of the plurality of battery cells. The electrical component is electrically connected to the one of the plurality of battery cells via the wire bonding that extends through the blind hole. The electrical component comprises a controller configured to control an operation of the plurality of battery cells. The conductive plate comprises a plurality of holes, individual of the plurality of cell tubes facing individual of the plurality of holes to permit combustion components from the plurality of cell tubes to pass through the plurality of holes. The plurality of cell tubes comprises a surface treatment that is electrically isolating. A circuit board assembly electrically connected to the printed circuit board, and a controller mounted on the circuit board assembly and configured to control the plurality of battery cells. The controller is configured to communicate, via a connector, with an electronic device separate from the circuit board assembly. The conductive plate is configured to electrically connect first terminals of plurality of battery cells, and another conductive plate is configured to electrically connect second terminals of the plurality of battery cells opposite the first terminals. The conductive plate and the another conductive plate can have a common structure. The plurality of cell tubes are configured to accommodate a total of between 4 battery cells and 32 battery cells, inclusive. The plurality of cell tubes are arranged in at least two rows of cell tubes and at least two columns of cell tubes. The plurality of cell tubes comprises aluminum, steel, or carbon. A vehicle housing supporting the battery module of claim 1 so that an air flow passes by the plurality of cell tubes when the vehicle housing is in motion, the vehicle housing being configured to fly.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecraft, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms).

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. A battery module comprising:
a plurality of cell tubes configured to accommodate a plurality of battery cells within the plurality of cell tubes so that individual of the plurality of battery cells are positioned within individual of the plurality of cell tubes;
a conductive plate comprising a printed circuit board, the printed circuit board comprising a first conductive layer, an isolating layer, and a blind hole in the isolating layer; and
a wire bonding extending through the blind hole to connect to the first conductive layer through the blind hole,
wherein the first conductive layer is configured to pass a current from at least one of the plurality of battery cells.

2. The battery module of claim 1, wherein the first conductive layer is configured to pass a current from all of the plurality of battery cells.

3. The battery module of claim 1, wherein the printed circuit board comprises a second conductive layer, the second conductive layer comprising a plurality of printed circuit board tracks and being thinner than the first conductive layer, an electronic component being mounted on the plurality of printed circuit board tracks.

4. The battery module of claim 3, wherein the wire bonding is configured to connect one of the plurality of printed circuit board tracks to the first conductive layer through the blind hole.

5. The battery module of claim 4, further comprising another wire bonding is-configured to electrically connect one of the plurality of battery cells to one of the plurality of printed circuit board tracks.

6. The battery module of claim 4, wherein the wire bonding comprises aluminum.

7. The battery module of claim 3, wherein the electrical component comprises a sensor configured to monitor a voltage, a current, a temperature, or an internal pressure of at least one of the plurality of battery cells.

8. The battery module of claim 3, wherein the electrical component comprises a switch configured to electrically connect and disconnect one of the plurality of battery cells.

9. The battery module of claim 3, wherein the electrical component is electrically connected to the one of the plurality of battery cells via the wire bonding that extends through the blind hole.

10. The battery module of claim 3, wherein the electrical component comprises a controller configured to control an operation of the plurality of battery cells.

11. The battery module of claim 1, wherein the conductive plate comprises a plurality of holes, individual of the plurality of cell tubes facing individual of the plurality of holes to permit combustion components from the plurality of cell tubes to pass through the plurality of holes.

12. The battery module of claim 1, wherein the plurality of cell tubes comprises a surface treatment that is electrically isolating.

13. The battery module of claim 1, further comprising:
a circuit board assembly electrically connected to the printed circuit board; and
a controller mounted on the circuit board assembly and configured to control the plurality of battery cells.

14. The battery module of claim 13, wherein the controller is configured to communicate, via a connector, with an electronic device separate from the circuit board assembly.

15. The battery module of claim 1, further comprising another conductive plate configured to electrically connect first terminals of plurality of battery cells, the conductive plate being configured to electrically connect second terminals of the plurality of battery cells opposite the first terminals.

16. The battery module of claim 15, wherein the conductive plate and the another conductive plate have a common structure.

17. The battery module of claim 1, wherein the plurality of cell tubes are configured to accommodate a total of between 4 battery cells and 32 battery cells, inclusive.

18. The battery module of claim 1, wherein the plurality of cell tubes are arranged in at least two rows of cell tubes and at least two columns of cell tubes.

19. The battery module of claim 1, wherein the plurality of cell tubes comprises aluminum, steel, or carbon.

20. A vehicle housing supporting the battery module of claim 1 so that an air flow passes by the plurality of cell tubes when the vehicle housing is in motion, the vehicle housing being configured to fly.

* * * * *

UNITED STATES PATENT AND TRADEMARK OFFICE
CERTIFICATE OF CORRECTION

| | |
|---|---|
| PATENT NO. | : 11,063,323 B2 |
| APPLICATION NO. | : 17/064012 |
| DATED | : July 13, 2021 |
| INVENTOR(S) | : Demont et al. |

It is certified that error appears in the above-identified patent and that said Letters Patent is hereby corrected as shown below:

In the Claims

In Column 27, Line 41, Claim 5, delete "is-configured" and insert --configured--.

Signed and Sealed this
Fourteenth Day of March, 2023

Katherine Kelly Vidal
*Director of the United States Patent and Trademark Office*